(12) United States Patent
Huang

(10) Patent No.: US 11,984,118 B2
(45) Date of Patent: May 14, 2024

(54) ARTIFICIAL INTELLIGENT SYSTEMS AND METHODS FOR DISPLAYING DESTINATION ON MOBILE DEVICE

(71) Applicant: BEIJING DIDI INFINITY TECHNOLOGY AND DEVELOPMENT CO., LTD., Beijing (CN)

(72) Inventor: Chen Huang, Beijing (CN)

(73) Assignee: BEIJING DIDI INFINITY TECHNOLOGY AND DEVELOPMENT CO., LTD., Beijing (CN)

(*) Notice: Subject to any disclaimer, the term of this patent is extended or adjusted under 35 U.S.C. 154(b) by 668 days.

(21) Appl. No.: 17/163,590

(22) Filed: Feb. 1, 2021

(65) Prior Publication Data

US 2021/0158820 A1    May 27, 2021

Related U.S. Application Data

(63) Continuation of application No. PCT/CN2018/102544, filed on Aug. 27, 2018.

(51) Int. Cl.
  *G10L 15/22* (2006.01)
  *G01C 21/36* (2006.01)
  (Continued)

(52) U.S. Cl.
  CPC .......... *G10L 15/22* (2013.01); *G01C 21/3608* (2013.01); *G06N 20/00* (2019.01);
  (Continued)

(58) Field of Classification Search
  None
  See application file for complete search history.

(56) References Cited

U.S. PATENT DOCUMENTS 8,521,526 B1 *  8/2013  Lloyd ................. G06F 16/3344
                                                  704/251
8,521,539 B1    8/2013  Teng et al.
(Continued)

FOREIGN PATENT DOCUMENTS

CN    102322866 A    1/2012
CN    104216972 A    12/2014
(Continued)

OTHER PUBLICATIONS

International Search Report in PCT/CN2018/102544 dated May 29, 2019, 4 pages.
(Continued)

*Primary Examiner* — Stella L. Woo
(74) *Attorney, Agent, or Firm* — METIS IP LLC

(57) ABSTRACT

Systems and methods for providing an online to offline service in response to a voice request from a user terminal are provided. A method includes: receiving a voice request from a user terminal; in response to the voice request, updating a customized recognition model trained using data of a plurality of points of interest associated with the user terminal; obtaining a general recognition model trained using data from general public; determining a literal destination associated with the voice request based at least on the voice request, the customized recognition model and the general recognition model.

20 Claims, 12 Drawing Sheets

(51) Int. Cl.
  *G06N 20/00*  (2019.01)
  *G10L 15/06*  (2013.01)
  *G10L 15/065*  (2013.01)
  *G10L 15/183*  (2013.01)
(52) U.S. Cl.
  CPC .......... *G10L 15/063* (2013.01); *G10L 15/065* (2013.01); *G10L 15/183* (2013.01)

(56) References Cited

U.S. PATENT DOCUMENTS

| | | | |
|---|---|---|---|
| 9,230,292 | B2 | 1/2016 | Amin et al. |
| 9,389,096 | B2 | 7/2016 | Holden et al. |
| 9,530,404 | B2 | 12/2016 | Hofer et al. |
| 11,054,270 | B1 * | 7/2021 | Singh ............... G08G 1/096888 |
| 2006/0293893 | A1 | 12/2006 | Horvitz |
| 2008/0133124 | A1 | 6/2008 | Sarkeshik |
| 2009/0156241 | A1 | 6/2009 | Staffaroni et al. |
| 2011/0295590 | A1 | 12/2011 | Lloyd et al. |
| 2013/0080161 | A1 | 3/2013 | Iwata et al. |
| 2013/0103300 | A1 | 4/2013 | Rakthanmanon et al. |
| 2017/0140759 | A1 * | 5/2017 | Kumar .................... G10L 15/30 |
| 2017/0300533 | A1 * | 10/2017 | Zhang .................... G06N 20/00 |
| 2018/0096678 | A1 * | 4/2018 | Zhou ....................... G10L 15/08 |
| 2018/0137857 | A1 | 5/2018 | Zhou et al. |
| 2018/0197543 | A1 | 7/2018 | Gruenstein et al. |
| 2018/0330737 | A1 * | 11/2018 | Paulik ..................... G10L 17/04 |
| 2019/0278870 | A1 * | 9/2019 | Novielli ................. G06N 20/00 |
| 2019/0370251 | A1 | 12/2019 | Li |
| 2019/0377897 | A1 * | 12/2019 | Griffin ................... G06N 20/00 |

FOREIGN PATENT DOCUMENTS

| | | |
|---|---|---|
| CN | 107578771 A | 1/2018 |
| CN | 108447476 A | 8/2018 |
| WO | 02089112 A1 | 11/2002 |
| WO | 2014022148 A1 | 2/2014 |

OTHER PUBLICATIONS

Written Opinion in PCT/CN2018/102544 dated May 29, 2019, 4 pages.

* cited by examiner

700

710 — Determining at least one customized result based on the voice request and the customized recognition model, each of the at least one customized result including a customized literal sequence and a sequence probability showing a probability that the voice request is associated with the customized literal sequence 720 — Determining at least one general result based on the voice request and the general recognition model, each of the at least one general result including a general literal sequence and a sequence probability showing a probability that the voice request is associated with the general literal sequence 730 — Determining a candidate literal sequence from the at least one customized literal sequence and the at least one general literal sequence as the literal destination, wherein the candidate literal sequence has a greatest sequence probability among the at least one customized literal sequence and the at least one general literal sequence

Obtaining literal information of a plurality of locations from the general public — 1110

Training an initial language model using the literal information of the plurality of location as inputs of the initial language model to obtain the general recognition model — 1120

FIG. 11

ARTIFICIAL INTELLIGENT SYSTEMS AND METHODS FOR DISPLAYING DESTINATION ON MOBILE DEVICE

CROSS-REFERENCE TO RELATED APPLICATIONS

This application is a continuation of International Patent Application No. PCT/CN2018/102544, filed on Aug. 27, 2018, the contents of which are incorporated herein by reference.

TECHNICAL FIELD

The present disclosure generally relates to systems and methods for using artificial intelligence to determine and display a literal destination to a user mobile device in an online to offline service system, in response to a voice request from the user mobile device.

BACKGROUND

In modern society, online to offline service applications are becoming increasingly widespread. However, when a user requests a service, the user has to spell or type in information manually in an application installed in a user mobile terminal. The user may be unfamiliar with the information (e.g., a service delivery destination, a service start origin location, a service item, etc.) that the user spells or inputs. For example, the user only knows a pronunciation of the information, but does not know the spelling or the written thereof. The spelling or the written often leads to wrong information and costs a long time. With artificial intelligence (AI) using trained voice recognition model, the user may request a service via voice, rather than spelling or typing in information manually.

However, technology solution of the exiting technology often trains a voice recognition model offline, and update the training data periodically. A problem of the exiting technology is that the voice recognition model is not trained in real time, which results an inaccurate voice recognition result. Accordingly, it is desirable to provide systems and methods for recognizing a location in a piece of voice accurately in requesting an online to offline service.

SUMMARY

An aspect of the present disclosure introduces a system of one or more electronic devices for providing an online to offline service in response to a voice request from a user terminal, comprising: at least one storage medium including an operation system and a set of instructions compatible with the operation system for providing an online to offline service in response to a voice request from a user terminal; and at least one processor in communication with the at least one storage medium, wherein when executing the operation system and the set of instructions, the at least one processor is further directed to: receive the voice request from the user terminal; obtain a customized recognition model trained using data associated with a plurality of points of interest associated with the user terminal; obtain a general recognition model trained using data from general public; determine a literal destination associated with the voice request based at least on the voice request, the customized recognition model and the general recognition model; in response to determining the literal destination, generate electronic signals including the literal destination; and send the electronic signals to the user terminal.

In some embodiments, the at least one processor is further directed to: in response to the voice request, update the customized recognition model.

In some embodiments, the plurality of points of interest includes a plurality of historical origins and a plurality of historical destinations of a plurality of historical online to offline services associated with a user of the user terminal.

In some embodiments, to determine the literal destination, the at least one processor is further directed to: determine at least one customized result based on the voice request and the customized recognition model, each of the at least one customized result including a customized literal sequence and a sequence probability showing a probability that the voice request is associated with the customized literal sequence; determine at least one general result based on the voice request and the general recognition model, each of the at least one general result including a general literal sequence and a sequence probability showing a probability that the voice request is associated with the general literal sequence; and determine a candidate literal sequence from the at least one customized literal sequence and the at least one general literal sequence as the literal destination, wherein the candidate literal sequence has a greatest sequence probability among the at least one customized literal sequence and the at least one general literal sequence.

In some embodiments, the customized recognition model is a customized language model, the general recognition model is a general language model, and the at least one processor is further directed to: determine a plurality of acoustic results of the voice request based on an acoustic model and the voice request; and determine the literal destination based at least on the plurality of acoustic results, the customized language model and the general language model.

In some embodiments, to determine the plurality of acoustic results, the at least one processor is further directed to: obtain a plurality of frames of the voice request; for each frame of the plurality of frames, identify at least one acoustic feature, and determine an acoustic result based on the acoustic model, wherein the at least one acoustic feature is an input of the acoustic model.

In some embodiments, each acoustic result includes a plurality of candidate voice elements and a plurality of corresponding acoustic probabilities, each acoustic probability shows a probability that the corresponding frame of voice request is associated with the corresponding candidate voice element.

In some embodiments, to obtain the general recognition model, the at least one processor is further directed to: obtain literal information of a plurality of locations from the general public; and train an initial language model using the literal information of the plurality of locations as inputs of the initial language model to obtain the general recognition model, wherein the general recognition model is a general language model.

In some embodiments, the literal information of the plurality of locations from the general public is crawled from Internet.

In some embodiments, the general recognition model is trained offline.

In some embodiments, the plurality of points of interest associated with the user terminal includes at least one of: a plurality of historical places where the user terminal had ever located, a plurality of locations of an area associated with the user terminal, or a plurality of historical locations of a plurality of similar users associated with the user terminal.

In some embodiments, the customized recognition model is a customized language model, and the data of the plurality of PIOs includes literal information of the plurality of POIs.

According to another aspect of the present disclosure, a method for providing an online to offline service in response to a voice request from a user terminal may be implemented on one or more electronic devices having at least one storage medium, and at least one processor in communication with the at least one storage medium, comprising: receiving a voice request from a user terminal; obtaining a customized recognition model trained using data of a plurality of points of interest associated with the user terminal; obtaining a general recognition model trained using data from general public; determining a literal destination associated with the voice request based at least on the voice request, the customized recognition model and the general recognition model; in response to determining the literal destination, generating electronic signals including the literal destination; and sending the electronic signals to the user terminal.

In some embodiments, the method further comprises: in response to the voice request, updating the customized recognition model.

In some embodiments, the plurality of points of interest includes a plurality of historical origins and a plurality of historical destinations of a plurality of historical online to offline services associated with a user of the user terminal.

In some embodiments, the determining the literal destination includes: determining at least one customized result based on the voice request and the customized recognition model, each of the at least one customized result including a customized literal sequence and a sequence probability showing a probability that the voice request is associated with the customized literal sequence; determining at least one general result based on the voice request and the general recognition model, each of the at least one general result including a general literal sequence and a sequence probability showing a probability that the voice request is associated with the general literal sequence; and determining a candidate literal sequence from the at least one customized literal sequence and the at least one general literal sequence as the literal destination, wherein the candidate literal sequence has a greatest sequence probability among the at least one customized literal sequence and the at least one general literal sequence.

In some embodiments, the customized recognition model is a customized language model, the general recognition model is a general language model, and the method further includes: determining a plurality of acoustic results of the voice request based on an acoustic model and the voice request; and determining the literal destination based at least on the plurality of acoustic results, the customized language model and the general language model.

In some embodiments, the determining the plurality of acoustic results includes: obtaining a plurality of frames of the voice request; for each frame of the plurality of frames, identifying at least one acoustic feature, and determining an acoustic result based on the acoustic model, wherein the at least one acoustic feature is an input of the acoustic model.

In some embodiments, each acoustic result includes a plurality of candidate voice elements and a plurality of corresponding acoustic probabilities, each acoustic probability shows a probability that the corresponding frame of voice request is associated with the corresponding candidate voice element.

In some embodiments, the obtaining the general recognition model includes: obtaining literal information of a plurality of locations from the general public; and training an initial language model using the literal information of the plurality of location as inputs of the initial language model to obtain the general recognition model, wherein the general recognition model is a general language model.

In some embodiments, the literal information of the plurality of locations from the general public is crawled from Internet.

In some embodiments, the general recognition model is trained offline.

In some embodiments, the plurality of points of interest associated with the user terminal includes at least one of: a plurality of historical places where the user terminal had ever located, a plurality of locations of an area associated with the user terminal, or a plurality of historical locations of a plurality of similar users associated with the user terminal.

In some embodiments, the customized recognition model is a customized language model, and the data of the plurality of PIOs includes literal information of the plurality of POIs.

According to still another aspect of the present disclosure, a non-transitory computer readable medium, comprising an operation system and at least one set of instructions compatible with the operation system for providing an online to offline service in response to a voice request from a user terminal, wherein when executed by at least one processor of one or more electronic device, the at least one set of instructions directs the at least one processor to: receive a voice request from a user terminal; obtain a customized recognition model trained using data of a plurality of points of interest associated with the user terminal; obtain a general recognition model trained using data from general public; determine a literal destination associated with the voice request based at least on the voice request, the customized recognition model and the general recognition model; in response to determining the literal destination, generate electronic signals including the literal destination; and send the electronic signals to the user terminal.

According to still another aspect of the present disclosure, an artificial intelligent system of one or more electronic devices for providing an online to offline service in response to a voice request from a user terminal, comprises: at least one information exchange port of a target system, wherein the target system is associated with a user terminal to receive a voice request from the user terminal through wireless communications between the at least one information exchange port and the user terminal; at least one storage medium including an operation system and a set of instructions compatible with the operation system for providing an online to offline service in response to a voice request from a user terminal; and at least one processor in communication with the at least one storage medium, wherein when executing the operation system and the set of instructions, the at least one processor is further directed to: receive the voice request from the user terminal; obtain a customized recognition model trained using data associated with a plurality of points of interest associated with the user terminal; obtain a general recognition model trained using data from general public; determine a literal destination associated with the voice request based at least on the voice request, the customized recognition model and the general recognition model; in response to determining the literal destination, generate electronic signals including the literal destination and a triggering code, wherein the triggering code is: in a format recognizable by an application installed in the user terminal, and configured to rend the application to generate a presentation of the literal destination on an interface of the user terminal; and send the electronic signals to the at least one information exchange port of the target system to direct the at least one information exchange port to send the electronic signals to the user terminal.

According to still another aspect of the present disclosure, a method for providing an online to offline service in response to a voice request from a user terminal, implemented on one or more electronic devices having at least one information exchange port, at least one storage medium, and at least one processor in communication with the at least one storage medium, comprising: receiving a voice request from a user terminal; obtain a customized recognition model trained using data of a plurality of points of interest associated with the user terminal; obtain a general recognition model trained using data from general public; determine a literal destination associated with the voice request based at least on the voice request, the customized recognition model and the general recognition model; in response to determining the literal destination, generating electronic signals including the literal destination and a triggering code, wherein the triggering code is: in a format recognizable by an application installed in the user terminal, and configured to rend the application to generate a presentation of the literal destination on an interface of the user terminal; and sending the electronic signals to the at least one information exchange port to direct the at least one information exchange port to send the electronic signals to the user terminal.

According to still another aspect of the present disclosure, a non-transitory computer readable medium, comprising an operation system and at least one set of instructions compatible with the operation system for providing an online to offline service in response to a voice request from a user terminal, wherein when executed by at least one processor of one or more electronic device, the at least one set of instructions directs the at least one processor to: receive a voice request from a user terminal; obtain a customized recognition model trained using data of a plurality of points of interest associated with the user terminal; obtain a general recognition model trained using data from general public; determine a literal destination associated with the voice request based at least on the voice request, the customized recognition model and the general recognition model; in response to determining the literal destination, generate electronic signals including the literal destination and a triggering code, wherein the triggering code is: in a format recognizable by an application installed in the user terminal, and configured to rend the application to generate a presentation of the literal destination on an interface of the user terminal; and send the electronic signals to at least one information exchange port of the one or more electronic device to direct the at least one information exchange port to send the electronic signals to the user terminal.

According to still another aspect of the present disclosure, an artificial intelligent system for providing an online to offline service in response to a voice request from a user terminal, comprising: a request obtaining module configured to receive a voice request from a user terminal; a model obtaining module configured to obtain a customized recognition model trained using data of a plurality of points of interest associated with the user terminal and a general recognition model trained using data from general public; a destination determining module configured to determine a literal destination associated with the voice request based at least on the voice request, the customized recognition model and the general recognition model.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 7 is a flowchart illustrating an exemplary process for determining a literal destination according to some embodiments of the present disclosure;

FIG. 11 is a flowchart illustrating an exemplary process for training a general recognition model according to some embodiments of the present disclosure.

DETAILED DESCRIPTION

Figure 1:
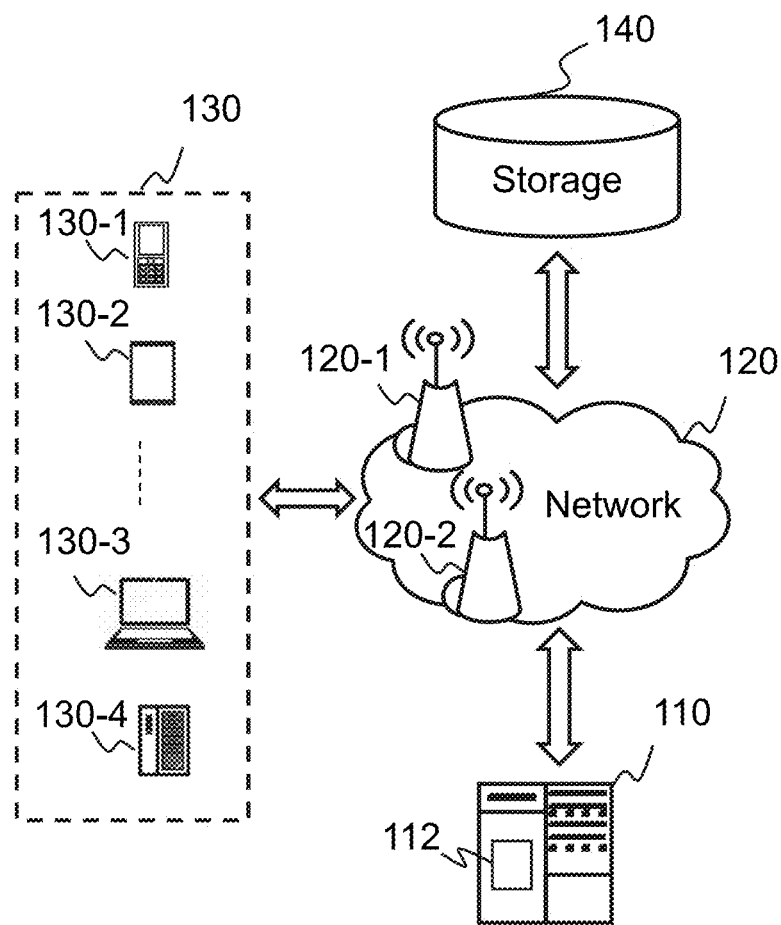
FIG. 1 is a schematic diagram illustrating an exemplary artificial intelligent (AI) system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure and the combination of parts and economies of manufacture, may become more apparent upon consideration of the following description with reference to the accompanying drawing(s), all of which form part of this specification. It is to be expressly understood, however, that the drawing(s) are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

An aspect of the present disclosure relates to systems and methods for providing an online to offline service in response to a voice request from a user terminal, and then display a destination on a target mobile device relating to the voice, such as a smartphone that sends the voice. To this end, the systems and methods may record activities of a user through his/her mobile phone in real-time, and update target activity data (e.g., voice or textual data relating to certain location) that is useful for training a voice recognition model in real-time. Then the system may use the target activity data as training data to train the voice recognition model in real-time. Because the training data is user-specific, the voice recognition model is a customized model specifically for the user. The training data may include literal information (e.g., information expressed through texts, codes, or any written forms recognizable by the system and/or convertible to a written forms recognizable by a human user) of a plurality of historical points of interest associated with the user terminal. Finally, to determine what the voice says, the systems and methods may determine a literal destination recognized from the voice request by comparing a result of the customized recognition model with a result of a general recognition model, and display the literal destination to let the user confirm. The systems and methods thereof may improve an accuracy of voice recognition and improve user experiences.

FIG. 1 is a schematic diagram of an exemplary online to offline service system 100 according to some embodiments of the present disclosure. For example, the online to offline service AI system 100 may be an online to offline service platform for transportation services such as taxi hailing, chauffeur services, delivery vehicles, carpool, bus service, driver hiring, shuttle services, and online navigation services. The online to offline service AI system 100 may be an online platform including a server 110, a network 120, a user terminal 130, and a storage 140. The server 110 may include a processing engine 112.

The server 110 may be configured to process information and/or data relating to a voice request. For example, the server 110 may train a customized recognition model and/or a general recognition model. As another example, the server 110 may recognize a literal destination from the voice request using the customized recognition model and/or the general recognition model. The literal destination may be a place expressed through texts, codes, or any written forms recognizable by a smart device and/or convertible to a written forms recognizable by a human user. Merely for illustration purpose, the current disclosure uses text as an example of the literal destination. In some embodiments, the server 110 may be a single server, or a server group. The server group may be centralized, or distributed (e.g., server 110 may be a distributed system). In some embodiments, the server 110 may be local or remote. For example, the server 110 may access information and/or data stored in the user terminal 130, and/or the storage 140 via the network 120. As another example, the server 110 may connect the user terminal 130, and/or the storage 140 to access stored information and/or data. In some embodiments, the server 110 may be implemented on a cloud platform. Merely by way of example, the cloud platform may be a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data relating to the voice request to perform one or more functions described in the present disclosure. For example, the processing engine 112 may train a customized recognition model and/or a general recognition model. As another example, the processing engine 112 may recognize a literal destination from the voice request using the customized recognition model and/or the general recognition model. In some embodiments, the processing engine 112 may include one or more processing engines (e.g., single-core processing engine(s) or multi-core processor(s)). Merely by way of example, the processing engine 112 may be one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The network 120 may facilitate exchange of information and/or data. In some embodiments, one or more components of the online to offline service AI system 100 (e.g., the server 110, the user terminal 130, and the storage 140) may transmit information and/or data to other component(s) in the online to offline service AI system 100 via the network 120. For example, the server 110 may receive a voice request from the user terminal 130 via the network 120. In some embodiments, the network 120 may be any type of wired or wireless network, or combination thereof. Merely by way of example, the network 130 may be a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the online to offline service AI system 100 may be connected to the network 120 to exchange data and/or information between them.

The user terminal 130 may be a mobile device used by a user to request for an online to offline service, such as taxi hailing. The user terminal 130 may also be other type of electronic device used by a user to request for the online to offline service. For example, the user terminal 130 may be used by the user to send a voice request to the server 110 to determine a literal destination of the voice request. As another example, the user terminal 130 may receive electronic signals including the literal destination from the server 110, and display the literal destination on an interface of the user terminal 130. In some embodiments, the user terminal 130 may be a mobile device 130-1, a tablet computer 130-2, a laptop computer 130-3, a built-in device in a motor vehicle 130-4, or the like, or any combination thereof. In some embodiments, the mobile device 130-1 may be a wearable device, a smart mobile device, a virtual reality device, an augmented reality device, or the like, or any combination thereof. In some embodiments, the wearable device may be a smart bracelet, a smart footgear, a smart glass, a smart helmet, a smart watch, a smart clothing, a smart backpack, a smart accessory, or the like, or any combination thereof. In some embodiments, the smart mobile device may be a smartphone, a personal digital assistance (PDA), a gaming device, a navigation device, a point of sale (POS) device, or the like, or any combination thereof. In some embodiments, the virtual reality device and/or the augmented reality device may be a virtual reality helmet, a virtual reality glass, a virtual reality patch, an augmented reality helmet, an augmented reality glass, an augmented reality patch, or the like, or any combination thereof. For example, the virtual reality device and/or the augmented reality device may be a Google Glass™, a RiftCon™, a Fragments™, a Gear VR™, etc. In some embodiments, built-in device in the motor vehicle 130-4 may be an onboard computer, an onboard television, etc.

In some embodiments, the user terminal 130 may be a device with positioning technology for locating the position of the user and/or the user terminal 130. The positioning technology used in the present disclosure may be a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning technologies may be used interchangeably in the present disclosure. In some embodiments, the user terminal 130 may further include at least one network port. The at least one network port may be configured to send information to and/or receive information from one or more components in the AI system 100 (e.g., the server 110, the storage 140) via the network 120. In some embodiments, the user terminal 130 may be implemented on a computing device 200 having one or more components illustrated in FIG. 2, or a mobile device 300 having one or more components illustrated in FIG. 3 in the present disclosure.

The storage 140 may store data and/or instructions. For example, the storage 140 may store data obtained from the user terminal 130. As another example, the storage 140 may store data and/or instructions that the server 110 may execute or use to perform exemplary methods described in the present disclosure. In some embodiments, the storage 140 may be a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 140 may be implemented on a cloud platform. Merely by way of example, the cloud platform may be a private cloud, a public cloud, a hybrid cloud, a community cloud, a distributed cloud, an inter-cloud, a multi-cloud, or the like, or any combination thereof.

In some embodiments, the storage 140 may include at least one network port to communicate with other devices in the AI system 100. For example, the storage 140 may be connected to the network 120 to communicate with one or more components of the online to offline service AI system 100 (e.g., the server 110, the user terminal 130) via the at least one network port. One or more components in the online to offline service AI system 100 may access the data or instructions stored in the storage 140 via the network 120. In some embodiments, the storage 140 may be directly connected to or communicate with one or more components in the online to offline service AI system 100 (e.g., the server 110, the user terminal 130). In some embodiments, the storage 140 may be part of the server 110.

In some embodiments, one or more components of the online to offline service AI system 100 (e.g., the server 110, the user terminal 130) may access the storage 140. In some embodiments, one or more components of the online to offline service AI system 100 may read and/or modify information relating to users, and/or the public when one or more conditions are met. For example, the server 110 may read and/or modify one or more users' information after completing a service.

In some embodiments, one or more components of the online to offline service AI system 100 (e.g., the server 110, the user terminal 130, and the storage 140) may communicate with each other in form of electronic and/or electromagnetic signals, through wired and/or wireless communication. In some embodiments, the AI system 100 may further include at least one information exchange port. The at least one exchange port may be configured to receive information and/or send information relating to the service request (e.g., in form of electronic signals and/or electromagnetic signals) between any electronic devices in the AI system 100. For example, the at least one information exchange port may receive a voice request from the user terminal 130 through wireless communication between the server 110 and the user terminal 130. As another example, the at least one information exchange port may send electromagnetic signals including a determined literal destination to the user terminal 130 through wireless communication. In some embodiments, the at least one information exchange port may be one or more of an antenna, a network interface, a network port, or the like, or any combination thereof. For example, the at least one information exchange port may be a network port connected to the server 110 to send information thereto and/or receive information transmitted therefrom.

Figure 2:
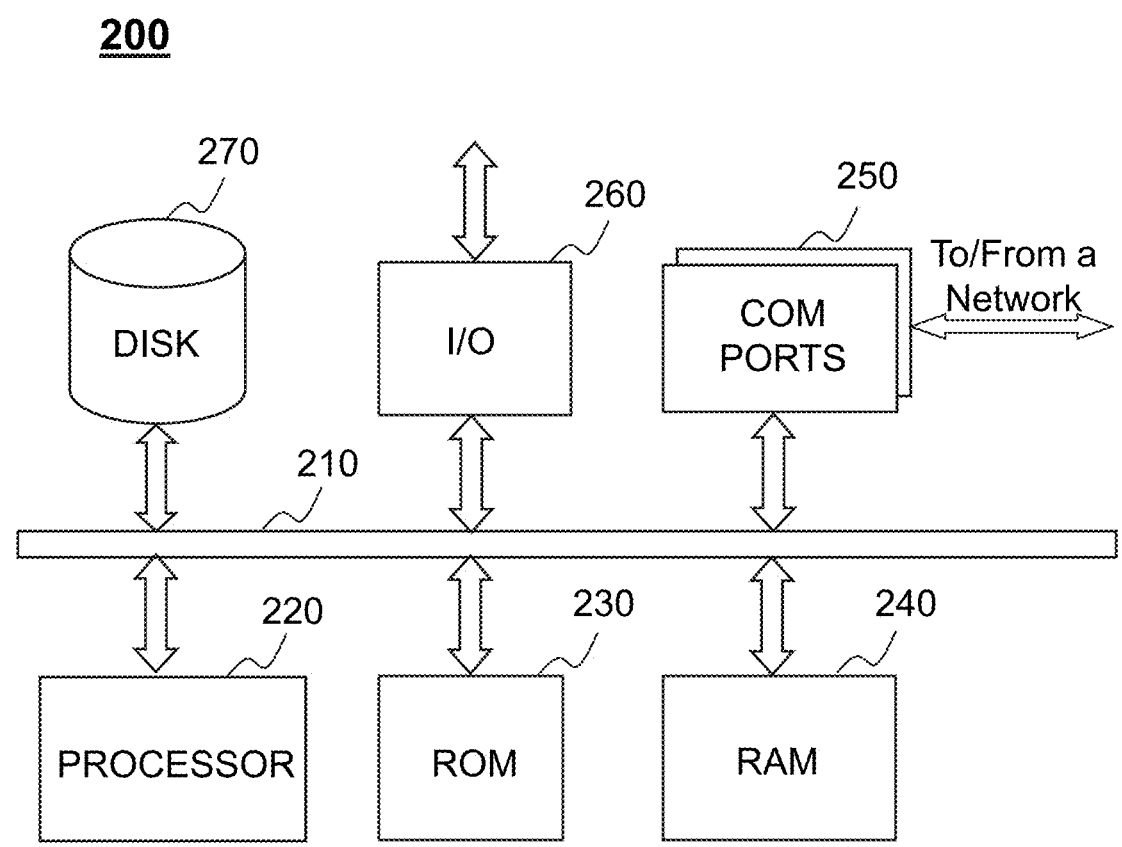
FIG. 2 is a schematic diagram illustrating exemplary hardware and/or software components of a computing device according to some embodiments of the present disclosure.

FIG. 2 is a schematic diagram illustrating exemplary hardware and software components of a computing device 200 on which the server 110, and/or the user terminal 130 may be implemented according to some embodiments of the present disclosure. For example, the processing engine 112 may be implemented on the computing device 200 and configured to perform functions of the processing engine 112 disclosed in this disclosure.

The computing device 200 may be used to implement an AI system 100 for the present disclosure. The computing device 200 may be used to implement any component of AI system 100 that perform one or more functions disclosed in the present disclosure. For example, the processing engine 112 may be implemented on the computing device 200, via its hardware, software program, firmware, or a combination thereof. Although only one such computer is shown, for convenience, the computer functions relating to the online to offline service as described herein may be implemented in a distributed fashion on a number of similar platforms, to distribute the processing load.

The computing device 200, for example, may include COM ports 250 connected to and from a network connected thereto to facilitate data communications. The COM port 250 may be any network port or information exchange port to facilitate data communications. The computing device 200 may also include a processor (e.g., the processor 220), in the form of one or more processors (e.g., logic circuits), for executing program instructions. For example, the processor may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. The processing circuits may also generate electronic signals including the conclusion or the result (e.g., the literal destination) and a triggering code. In some embodiments, the trigger code may be in a format recognizable by an operation system (or an application installed therein) of an electronic device (e.g., the user terminal 130) in the AI system 100. For example, the trigger code may be an instruction, a code, a mark, a symbol, or the like, or any combination thereof, that can activate certain functions and/or operations of a mobile phone or let the mobile phone execute a predetermined program(s). In some embodiments, the trigger code may be configured to rend the operation system (or the application) of the electronic device to generate a presentation of the conclusion or the result (e.g., the literal destination) on an interface of the electronic device. Then the interface circuits may send out the electronic signals from the processing circuits via the bus 210.

The exemplary computing device may include the internal communication bus 210, program storage and data storage of different forms including, for example, a disk 270, and a read only memory (ROM) 230, or a random access memory (RAM) 240, for various data files to be processed and/or transmitted by the computing device. The exemplary computing device may also include program instructions stored in the ROM 230, RAM 240, and/or other type of non-transitory storage medium to be executed by the processor 220. The methods and/or processes of the present disclosure may be implemented as the program instructions. The exemplary computing device may also include operation systems stored in the ROM 230, RAM 240, and/or other type of non-transitory storage medium to be executed by the processor 220. The program instructions may be compatible with the operation systems for providing the online to offline service. The computing device 200 also includes an I/O component 260, supporting input/output between the computer and other components. The computing device 200 may also receive programming and data via network communications.

Merely for illustration, only one processor is illustrated in FIG. 2. Multiple processors are also contemplated; thus, operations and/or method steps performed by one processor as described in the present disclosure may also be jointly or separately performed by the multiple processors. For example, if in the present disclosure the processor of the computing device 200 executes both step A and step B, it should be understood that step A and step B may also be performed by two different processors jointly or separately in the computing device 200 (e.g., the first processor executes step A and the second processor executes step B, or the first and second processors jointly execute steps A and B).

Figure 3:
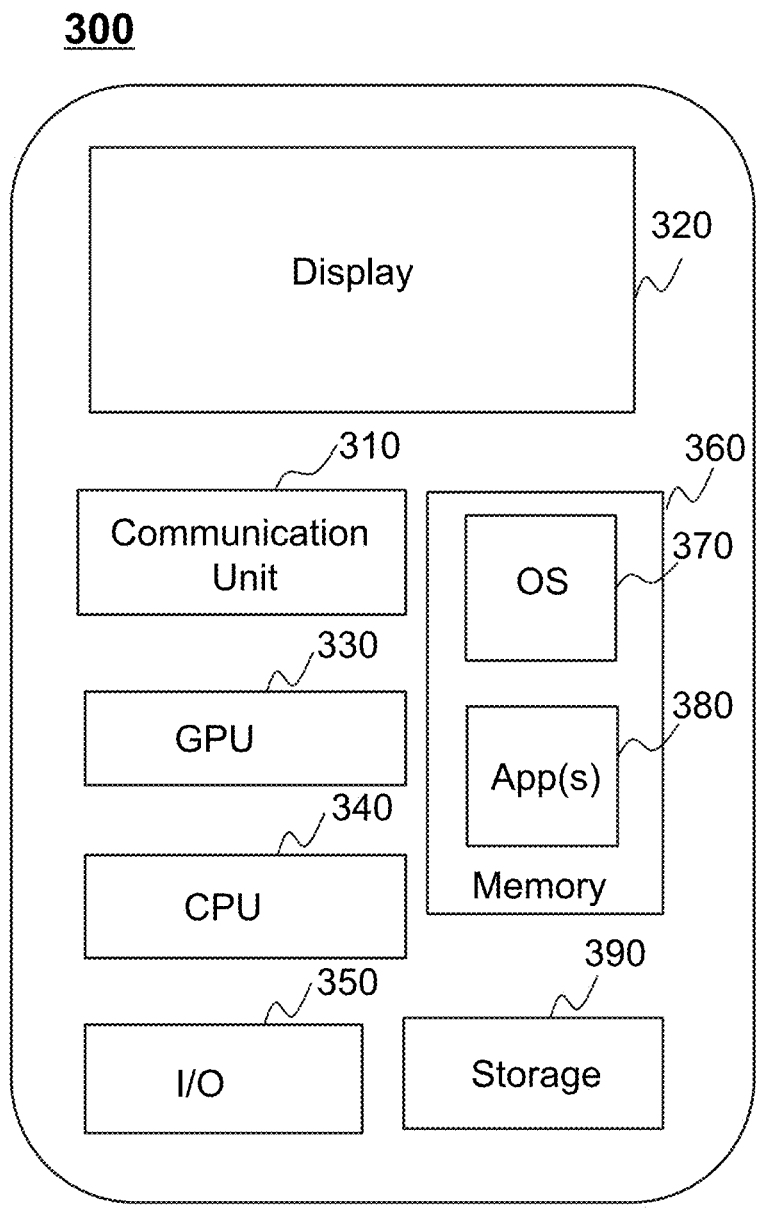
FIG. 3 is a schematic diagram illustrating exemplary hardware and/or software components of a mobile device according to some embodiments of the present disclosure.

FIG. 3 is a schematic diagram illustrating exemplary hardware and/or software components of an exemplary mobile device 300 on which the user terminal 130 may be implemented according to some embodiments of the present disclosure.

As illustrated in FIG. 3, the mobile device 300 may include a communication platform 310, a display 320, a graphic processing unit (GPU) 330, a central processing unit (CPU) 340, an I/O 350, a memory 360, and a storage 390. The CPU may include interface circuits and processing circuits similar to the processor 220. In some embodiments, any other suitable component, including but not limited to a system bus or a controller (not shown), may also be included in the mobile device 300. In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to a voice request for a service. User interactions with the information stream may be achieved via the I/O devices 350 and provided to the processing engine 112 and/or other components of the system 100 via the network 120.

To implement various modules, units, and their functionalities described in the present disclosure, computer hardware platforms may be used as the hardware platform(s) for one or more of the elements described herein (e.g., the online to offline service AI system 100, and/or other components of the online to offline service AI system 100 described with respect to FIGS. 1-10). The hardware elements, operating systems and programming languages of such computers are conventional in nature, and it is presumed that those skilled in the art are adequately familiar therewith to adapt those technologies to provide a service in response to a voice request as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

One of ordinary skill in the art would understand that when an element of the online to offline service AI system 100 performs, the element may perform through electrical signals and/or electromagnetic signals. For example, when a server 110 processes a task, such as obtain a service request via a piece of voice, the server 110 may operate logic circuits in its processor to process such task. When the server 110 receives the voice request, a processor of the server 110 may generate electrical signals encoding the voice request. The processor of the server 110 may then send the electrical signals to at least one information exchange port of a target system associated with the server 110. The server 110 communicates with the target system via a wired network, the at least one information exchange port may be physically connected to a cable, which may further transmit the electrical signals to an input port (e.g., an information exchange port) of the user terminal 130. If the server 110 communicates with the target system via a wireless network, the at least one information exchange port of the target system may be one or more antennas, which may convert the electrical signals to electromagnetic signals. Within an electronic device, such as the user terminal 130, and/or the server 110, when a processor thereof processes an instruction, sends out an instruction, and/or performs an action, the instruction and/or action is conducted via electrical signals. For example, when the processor retrieves or saves data from a storage medium (e.g., the storage 140), it may send out electrical signals to a read/write device of the storage medium, which may read or write structured data in the storage medium. The structured data may be transmitted to the processor in the form of electrical signals via a bus of the electronic device. Here, an electrical signal may be one electrical signal, a series of electrical signals, and/or a plurality of discrete electrical signals.

Figure 4:
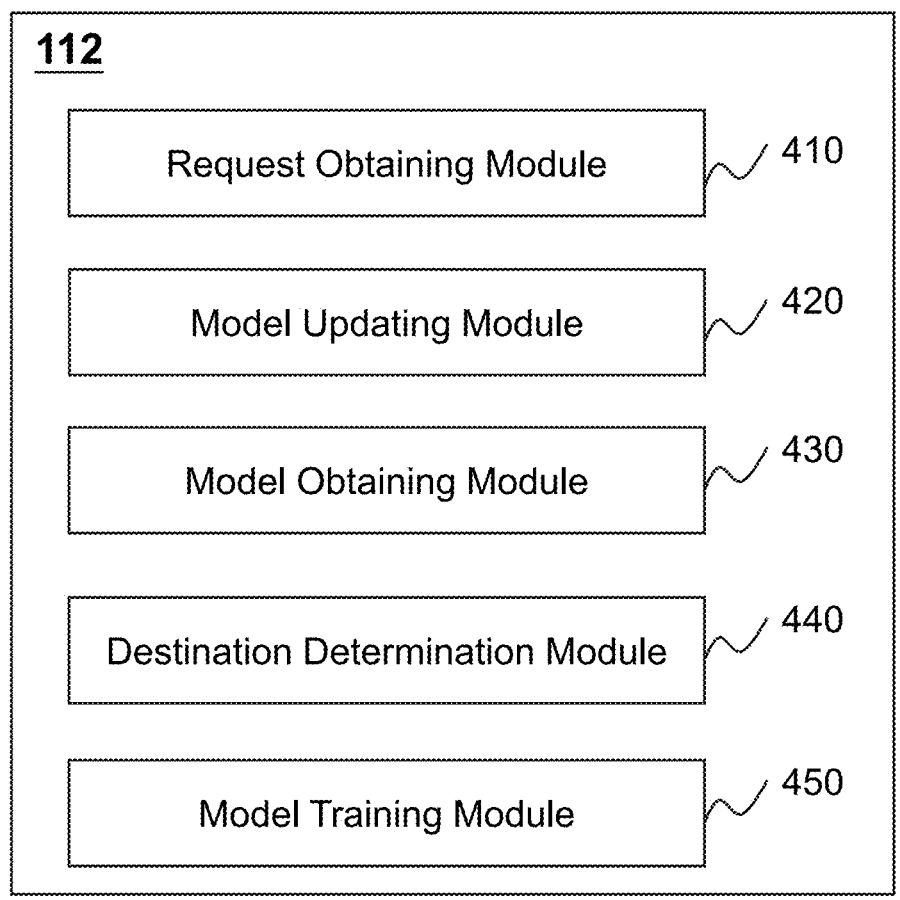
FIG. 4 is a block diagram illustrating an exemplary processing engine according to some embodiments of the present disclosure.

FIG. 4 is a block diagram illustrating an exemplary processing engine 112 according to some embodiments of the present disclosure.

As illustrated in FIG. 4, the processing engine 112 may include a request obtaining module 410, a model updating module 420, a model obtaining module 430, a destination determination module 440, and a model training module 450.

The request obtaining module 410 may be configured to obtain a voice request from the user terminal 130. In some embodiments, the voice request may be a service request in form of a piece of voice, which is initiated by a user of the user terminal 130. In some embodiments, the voice request may be a transportation service request, a taxi hailing service request, a navigation service request, or the like, or any combination thereof. In some embodiments, the voice request may be a piece of voice including a destination, an origin, a start time, a service type, or the like, or any combination thereof. The service type may be a vehicle type in a transportation service or in a taxi hailing service, a trip mode in a navigation service, or the like, or any combination thereof.

The model updating module 420 may be configured to update a model used for determining a literal destination for the voice request. In some embodiments, the model updating module 420 may update a customized recognition model in response to receiving the voice request from the request obtaining module 410. In some embodiments, the customized recognition model may be trained using data of a plurality of points of interest (POIs) associated with the user terminal. The trained customized recognition model may be stored in a storage medium (e.g., the storage 140, ROM 230 or RAM 240) of the AI system 100. When the request obtaining module 410 receives the voice request from the user terminal 130, the model updating module 420 may access the storage medium to obtain the trained customized recognition model and update the trained customized recognition model. In some embodiments, the model updating module 420 may update the trained customized recognition model by inputting a plurality of POIs of at least one historical service before the current voice request. For example, model updating module 420 may update the trained customized recognition model by inputting at least one origin and at least one destination of the at least one historical service of the user and/or the user terminal into the trained customized recognition model. In some embodiments, the updating of the trained customized recognition model may be a process of adjusting or modifying parameters in the trained customized recognition model. For example, the updating of the trained customized recognition model may lead to a more accurate recognition result of the voice request than the trained customized recognition model. In some embodiments, the updated customized recognition model may be the same as the trained customized recognition model. For example, the data of at least one origin and at least one destination that used to update the trained customized recognition model may be same as the data of a plurality of POIs that used to train the customized recognition model.

In some embodiments, the model updating module 420 may online update the trained customized recognition model in real time. For example, every time the request obtaining module 410 receives a new voice request, the model updating module 420 may input a plurality of POIs of at least one historical service before the current voice request to update the trained customized recognition model. In some embodiments, the model updating module 420 may update the trained customized recognition model in real time, and the model updating module 420 may also update the trained customized recognition model periodically. For example, the model updating module 420 may update the trained customized recognition model at a time interval of a predetermined period of time (e.g., every several hours, every day, every several days, every month, etc.). As another example, the model updating module 420 may update the trained customized recognition model after the user of the user terminal complete a service.

The model obtaining module 430 may be configured to obtain a model. In some embodiments, the model obtaining module 430 may obtain a general recognition model and/or a customized recognition from a storage medium (e.g., the storage 140, ROM 230, RAM 240, or a storage module) of the AI system 100. In some embodiments, the general recognition model and/or the customized recognition module may be trained by the model training module 450.

The destination determination module 440 may be configured to determine a literal destination associated with the voice request obtained from the request obtaining module 410.

In some embodiments, the destination determination module 440 determine the literal destination based on at least on the voice request, the customized recognition model and the general recognition model. The destination determination module 440 may determine at least one customized result based on the voice request and the customized recognition model, and at least one general result based on the voice request and the general recognition model. The destination determination module 440 may determine a candidate literal sequence from the at least one customized result and the at least one general result as the literal destination.

In some embodiments, the destination determination module 440 may determine the literal destination based on at least on the voice request, the customized language model and the language recognition model. For example, the destination determination module 440 may determine a plurality of acoustic results of the voice request based on an acoustic model and the voice request, and determine the literal destination based at least one the plurality of acoustic results, the customized language model and the general language model.

The model training module 450 may be configured to train a model. In some embodiments, the model training module 450 may train the customized recognition model. For example, the model training module 450 may obtain data of a plurality of points of interest (POIs) associated with the user terminal, and input the data of the plurality of POIs into an algorithm and/or method for recognizing voice into text (e.g., an initial voice recognition model, an initial language model) to obtain the customized recognition model. In some embodiments, the model training module 450 may train the general recognition model. For example, the model training module 450 may obtain data of a plurality of locations from the general public, and input the data of the plurality of locations from the general public into an algorithm and/or method for recognizing voice into text (e.g., an initial voice recognition model, an initial language model) to obtain the general recognition model.

The modules in the processing engine 112 may be connected to or communicate with each other via a wired connection or a wireless connection. The wired connection may be a metal cable, an optical cable, a hybrid cable, or the like, or any combination thereof. The wireless connection may be a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the model updating module 420 and the model training module 450 may be combined as a single module which may both train a model and update the model. As another example, the destination determination module 440 may be divided into a customized result determination unit, a general result determination unit, and a literal sequence determination unit, which may determine a customized result, a general result, and a candidate literal sequence as the literal destination, respectively. As still another example, the processing engine 112 may include a storage module (not shown) used to store data and/or information of the model and/or the literal destination.

Figure 5A:
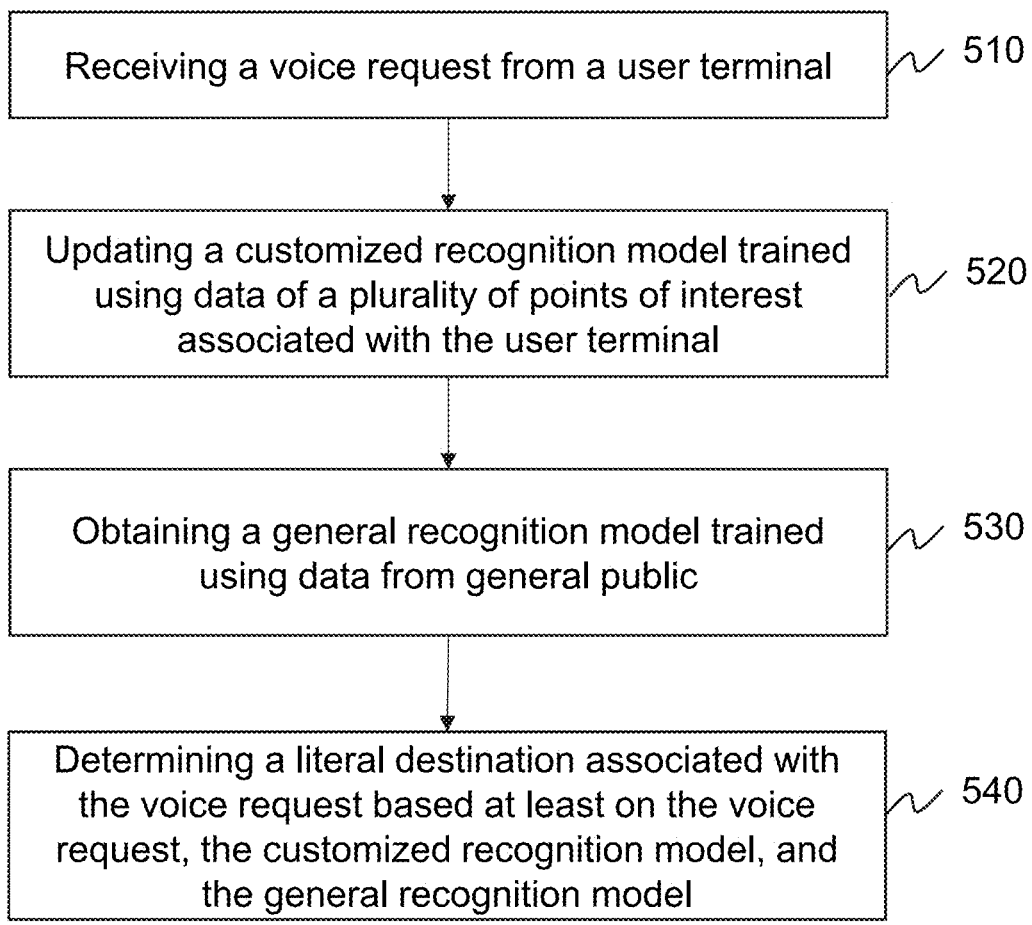
FIG. 5A is a flowchart illustrating an exemplary process for determining a literal destination according to some embodiments of the present disclosure.

FIG. 5A is a flowchart illustrating an exemplary process for determining a literal destination according to some embodiments of the present disclosure. The process 500 may be executed by the online to offline service AI system 100. For example, the process 500 may be implemented as a set of instructions (e.g., an application) stored in the storage ROM 230 or RAM 240. The processor 220 may execute the set of instructions, and when executing the instructions, it may be configured to perform the process 500. The operations of the illustrated process presented below are intended to be illustrative. In some embodiments, the process 500 may be accomplished with one or more additional operations not described and/or without one or more of the operations discussed. Additionally, the order in which the operations of the process as illustrated in FIG. 5A and described below is not intended to be limiting.

In process 510, the processing engine 112 (e.g., the processor 220, the request obtaining module 410) may receive a voice request from the user terminal 130. In some embodiments, the voice request may be a service request in a form of a piece of voice, which is initiated by a user of the user terminal 130. In some embodiments, the voice request may be a transportation service request, a taxi hailing service request, a navigation service request, or the like, or any combination thereof. In some embodiments, the voice request may be a piece of voice related to the service, including but not limited to a destination, an origin, a start time, a service type, or the like, or any combination thereof. The service type may be a vehicle type in a transportation service or in a taxi hailing service, a trip mode in a navigation service, or the like, or any combination thereof.

In some embodiments, the user of the user terminal 130 may send and/or transmit the voice request to an information exchange port of a target system through wireless communication. The target system may include the user terminal 130, the network 120, and the information exchange port between the network 120 and the server 110. The information exchange port may be an interface between the network 120 and the server 110. For example, the information exchange port may be one or more network I/O ports (e.g., antennas) connected to and/or in communication with the server 110. The information exchange port of the target system may transmit the voice request to the processing engine 112. In some embodiments, the user may be a passenger, a driver, a traveler, or the like, or any combination thereof.

In process 520, the processing engine 112 (e.g., the processor 220, the model updating module 420) may update a customized recognition model in response to the voice request received from the user terminal 130.

In some embodiments, the customized recognition model may be trained using data of a plurality of points of interest (POIs) associated with the user terminal. For example, the processing engine 112 may input data of the plurality of POIs into an algorithm and/or method for recognizing voice into text (e.g., an initial voice recognition model, an initial language model) to obtain the customized recognition model.

In some embodiments, the POIs associated with the user terminal may include a plurality of locations that the user of the user terminal has ever used and/or located. For example, the POIs may include a plurality of locations obtained from a plurality of historical services that the user received, including sightseeing history, dinning and entertaining history, transportation services history, such as taxi hailing services, navigation services, goods delivery service, sightseeing history, or the like, or any combination thereof. The POIs may include a plurality of historical origins of the plurality of historical services, a plurality of historical destinations of the plurality of historical services, a plurality of historical locations that the user has ever located during the plurality of historical services, or the like, or any combination thereof.

In some embodiments, the POIs associated with the user terminal may include a plurality of locations associated with a particular subject associated with the user and/or the user terminal. For example, the POIs may include a plurality of locations in an area where the user and/or the user terminal is, a plurality of historical locations (e.g., historical origins, historical destinations, etc.) of a plurality of similar users, or the like, or any combination thereof. The area may be a city region, a district region, a predetermined region, or the like, or any combination thereof. The similar users may be a plurality of users that have same or similar travel or navigation habits, do same or similar jobs, are in similar age, or the like, or any combination thereof. In some embodiments, the processing engine 112 classify a plurality of users of the AI system 100 to obtain the similar users associated with the user terminal.

In some embodiments, the data of the plurality of POIs that used to train the customized recognition model may be literal information of the plurality of POIs, pronunciations of the plurality of POIs, or any linguistic features of the plurality of POIs, or the like, or any combination thereof.

In some embodiments, the customized recognition model may be an AI algorithms and/or method that may recognize an input of the customized recognition model, and convert the input into text, code, or other written form recognizable by a human user or by electronic devices. The customized recognition model may be specific for a specific individual, such as the user of the user terminal.

In some embodiments, the input of the customized recognition model may be the voice request, and the customized recognition model may be a customized AI algorithms and/or method that may recognize the voice in the voice request into text, code, or other written form recognizable by a human user or by electronic devices (e.g., a literal destination, a literal origin, a literal service type, etc.). For example, the processing engine 112 may input the voice request for requesting a taxi hailing service into the customized recognition model. The output of the customized recognition model may be textual result recognized from the voice request. The processing engine 112 may extract a target POI included in the textual result. In some embodiments, the customized recognition model may include an acoustic model, a language model, a pronunciation dictionary, a decoder, or the like, or any combination thereof. In some embodiments, the customized recognition model may be an integrated AI model that trained by literal information of the plurality of POIs and the corresponding pronunciations of the plurality of POIs. When the processing engine 112 input the voice request into the customized recognition model, the customized recognition model may output textual result recognized from the voice request. The processing engine 112 may extract a target POI included in the textual result. A schematic diagram illustrating a process of recognizing a voice request into literal destination using the customized recognition model may be found in FIG. 6A and the descriptions thereof.

In some embodiments, the input of the customized recognition model may be information obtained from the voice request. For example, the processing engine 112 may input the voice request into an acoustic model to obtain a plurality of acoustic result (e.g., voice elements, linguistic units, phonemes, syllables, etc.). The customized recognition model may be a customized language model that may recognize the acoustic results of the voice request into text (e.g., a literal destination, a literal origin, a literal service type, etc.). For example, the processing engine 112 may map the plurality of phonemes of the voice request output from the acoustic model with words using a pronunciation dictionary. The processing engine 112 may input the mapping words of the plurality of phonemes into the customized recognition model. The customized recognized result may include at least one customized literal sequence and the corresponding sequence probability showing a probability that the customized literal sequence is associated with the voice request. For example, the sequence probability may be a likelihood that the user may express the corresponding customized literal sequence in the voice request. In some embodiments, the processing engine 112 may determine the sequence probability based on the acoustic model and the customized recognition model. For example, the sequence probability may be a sum of a product of acoustic probabilities corresponding to a plurality of phonemes outputted from the acoustic model and a product of literal probabilities corresponding to a plurality of words outputted from the customized recognition model. The processing engine 112 may determine an origin and/or a destination of the user in form of text by selecting a customized literal sequence with a greatest sequence probability from the at least one customized literal sequence. In some embodiments, the customized language model may include or may be a model trained from a unigram model, an N-Gram model, an exponential language model, a neural language model, or the like, or any combination thereof. A schematic diagram illustrating a process of recognizing a voice request into literal destination using the customized language model may be found in FIG. 6B and the descriptions thereof.

In some embodiments, the trained customized recognition model may be stored in a storage medium (e.g., the storage 140, ROM 230 or RAM 240) of the AI system 100. When the processing engine 112 receives the voice request from the user terminal 130, the processing engine 112 may access the storage medium to obtain the trained customized recognition model and update the trained customized recognition model. In some embodiments, the processing engine 112 may update the trained customized recognition model by inputting a plurality of POIs of at least one historical service before the current voice request. For example, the processing engine 112 may update the trained customized recognition model by inputting at least one origin and at least one destination of the at least one historical service of the user and/or the user terminal into the trained customized recognition model. In some embodiments, the updating of the trained customized recognition model may be a process of adjusting or modifying parameters in the trained customized recognition model. The updating of the trained customized recognition model may lead to a more accurate recognition result of the voice request than the trained customized recognition model. In some embodiments, the updated customized recognition model may be the same as the trained customized recognition model. For example, the data of at least one origin and at least one destination that used to update the trained customized recognition model may be same as the data of a plurality of POIs that used to train the customized recognition model.

In some embodiments, the processing engine 112 may online update the trained customized recognition model in real time. For example, every time the processing engine 112 receives a new voice request, the processing engine 112 may input a plurality of POIs of at least one historical service before the current voice request into the trained customized recognition to update the trained customized recognition model. In some embodiments, the processing engine 112 may update the trained customized recognition model in real time, and may also update the trained customized recognition model periodically. For example, the processing engine 112 may update the trained customized recognition model at a time interval of a predetermined period of time (e.g., every several hours, every day, every several days, every month, etc.). As another example, the processing engine 112 may update the trained customized recognition model after the user of the user terminal complete a service.

In some embodiments, in response to the voice request, the processing engine 112 may online train an initial recognition model to obtain the customized recognition model. For example, every time the processing engine 112 receives a new voice request, the processing engine 112 may input all POIs of a plurality of historical service of the user and/or the user terminal before the current voice request into the initial recognition model. The initial recognition model may be an algorithm and/or method for or used for recognizing voice into text.

In process 530, the processing engine 112 (e.g., the processor 220, the model obtaining model 430) may obtain a general recognition model. In some embodiments, the general recognition model may be trained using data collected from general public. For example, the processing engine 112 may input data collected from the general public into an algorithm and/or method for recognizing voice into text (e.g., an initial recognition model, an initial language model) to obtain the general recognition model. The general recognition model may be of the same type of model as the customized model. For example, the general recognition model and the customized recognition model may be trained from the same initial model with data collected from different sources. Alternatively, the general recognition model and the customized recognition model may be of different types of model.

In some embodiments, the data from the general public may include literal information of a plurality of locations from the general public, pronunciations of the plurality of locations from the general public, or any linguistic features of the plurality of locations from the general public, or the like, or any combination thereof. In some embodiments, the plurality of locations from the general public may be crawled by a web crawler from the whole Internet, a website, a service server, or the like, or any combination thereof.

In some embodiments, the general recognition model may be an AI algorithms and/or method that may recognize an input of the general recognition model, and convert the input into text, code, or other written form recognizable by a human user or by electronic devices. The general recognition model may be universal for all individuals of the general public.

In some embodiments, the input of the general recognition model may be the voice request, and the general recognition model may be a genera AI algorithms and/or method that may recognize the voice in the voice request into text, code, or other written form recognizable by a human user or by electronic devices (e.g., a literal destination, a literal origin, a literal service type, etc.). For example, the processing engine 112 may input the voice request for requesting a taxi hailing service into the general recognition model. The output of the general recognition model may be textual result recognized from the voice request. The processing engine 112 may extract a target POI included in the textual result. In some embodiments, the general recognition model may include an acoustic model, a language model, a pronunciation dictionary, a decoder, or the like, or any combination thereof. In some embodiments, the general recognition model may be an integrated AI model that trained by literal data of a plurality of locations from the general public and the corresponding pronunciations of the plurality of locations. When the processing engine 112 input the voice request into the general recognition model, the general recognition model may output textual result recognized from the voice request. The processing engine 112 may extract a target POI included in the textual result. A schematic diagram illustrating a process of recognizing a voice request into literal destination using the general recognition model may be found in FIG. 6A and the descriptions thereof.

In some embodiments, the input of the general recognition model may be information obtained from the voice request. For example, the processing engine 112 may input the voice request into an acoustic model to obtain a plurality of acoustic result (e.g., voice elements, linguistic units, phonemes, syllables, etc.). The general recognition model may be a general language model that may recognize the acoustic results of the voice request into text (e.g., a literal destination, a literal origin, a literal service type, etc.). For example, the processing engine 112 may map a plurality of phonemes output from the acoustic model with words using a pronunciation dictionary, and input the mapping result of a plurality of phonemes into the general recognition model. The general recognized result may include at least one general literal sequence and the corresponding sequence probability showing a probability that the general literal sequence is associated with the voice request. For example, the sequence probability may be a likelihood that the user may express the corresponding general literal sequence in the voice request. In some embodiments, the processing engine 112 may determine the sequence probability based on the acoustic model and the general recognition model. For example, the sequence probability may be a sum of a product of acoustic probabilities corresponding to a plurality of phonemes outputted from the acoustic model and a product of literal probabilities corresponding to a plurality of words outputted from the general recognition model. The processing engine 112 may determine an origin and/or a destination of the user in form of text by selecting a general literal sequence with a greatest sequence probability from the at least one general literal sequence. In some embodiments, the general language model may be a model trained from a unigram model, an N-Gram model, an exponential language model, a neural language model, or the like, or any combination thereof. A schematic diagram illustrating a process of recognizing a voice request into literal destination using the general language model may be found in FIG. 6B and the descriptions thereof.

For different voice request, the general recognition model and the customized recognition model may show different recognition accuracy. For example, if the voice request includes a location that the user has ever used and/or located, or when the user of the voice request has a strong accent, the customized recognition model may recognize a more accurate textural result than a recognition result of the general recognition model. If the voice request includes a location that the user has never used and/or located, due to lack of training data, the recognition result from the customized recognition model may have lower recognition accuracy than the recognition result from the general recognition model.

In process 540, the processing engine 112 (e.g., the processor 220, the destination determination module 440) may determine a literal destination associated with the voice request based at least on the voice request, the customized recognition model, and the general recognition model.

The literal destination may be a place expressed through texts, codes, or any written forms recognizable by a smart device and/or convertible to a written forms recognizable by a human user. Merely for illustration purpose, the current disclosure uses text as an example of the literal destination. In some embodiments, the literal destination may be any textual information of a location recognized from the voice request. For example, the literal destination may be textual information of an origin of the service, textual information of a destination of the service, textual information of a pass through location during the service, or the like, or any combination thereof.

In some embodiments, the processing engine 112 may determine at least one customized result based on the voice request and the customized recognition model, and at least one general result based on the voice request and the general recognition model. The processing engine 112 may compare the at least one customized result and the at least one general result, and select an optimal result from the at least one customized result and the at least one general result as the literal destination. The optimal result may indicate a location with the literal destination that has a maximum likelihood that the user may express in the voice request.

In some embodiments, the at least one customized result may include at least one customized literal sequence and corresponding sequence probability thereof. The at least one general result may include at least one general literal sequence and corresponding sequence probability thereof. A literal sequence (e.g., a customized literal sequence or a general literal sequence) may be a predicted literal sequence that the user may express in the voice request that the customized recognition model or the general recognition model predicts. The corresponding sequence probability may be a likelihood that the user may express the corresponding customized literal sequence in the voice request. The higher the sequence probability, the more likely that the corresponding customized literal sequence is that the user may express that the corresponding model recognized from the voice request.

In some embodiments, the processing engine 112 may compare the sequence probabilities of the at least one customized literal sequence and the at least one general literal sequence, and select the candidate literal sequence that has a greatest sequence probability from the at least one customized literal sequence and the at least one general literal sequence. The candidate literal sequence may be designated as the literal destination.

For example, the processing engine 112 receives a voice request including voice information of "Dinghao Building" from the user. The user has ever used the "Dinghao Building" as historical destination in a taxi hailing service. The customized recognition model is trained using the data of "Dinghao Building". When the processing engine 112 inputs the voice request (or data obtained from the voice request) into the customized recognition model and the general recognition model, respectively, the customized recognition model outputs textural "Dinghao Building" with the sequence probability of 99%; the general recognition model outputs textural "Dihao Building" with the sequence probability of 90%, and textural "Dinghao Building" with the sequence probability of 80%. The processing engine 112 may designate the textural "Dinghao Building" with the sequence probability of 99% output from the customized recognition model as the literal destination.

As another example, the processing engine 112 receives a voice request including voice information of "Dihao Building" from the user. The user has never used the "Dihao Building" as historical origin or destination in the taxi hailing service. When the processing engine 112 inputs the voice request (or data obtained from the voice request) into the customized recognition model and the general recognition model, respectively, the customized recognition model outputs textural "Dinghao Building" with the sequence probability of 69%; the general recognition model outputs textural "Dihao Building" with the sequence probability of 95%, and textural "Dinghao Building" with the sequence probability of 80%. The processing engine 112 may designate the textural "Dihao Building" with the sequence probability of 90% output from the general recognition model as the literal destination.

Figure 5B:
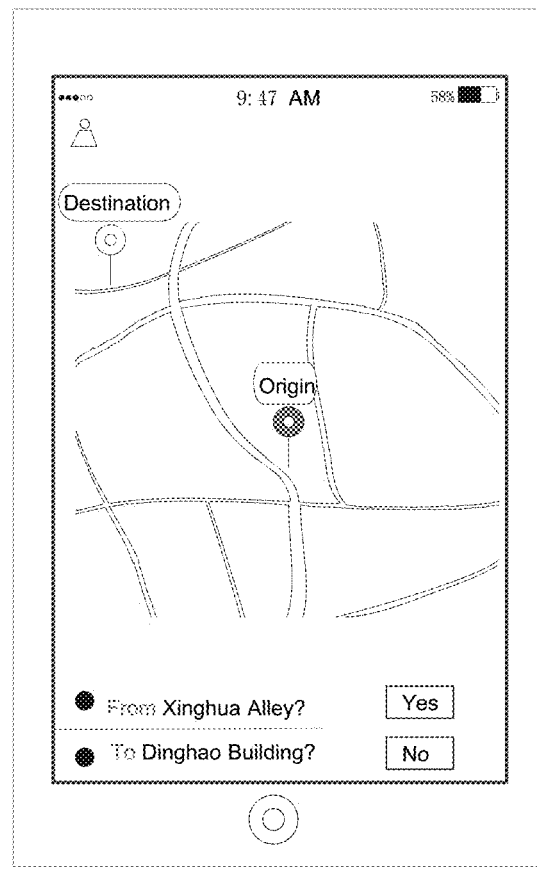
FIG. 5B is an exemplary user interface of a user terminal for presenting a literal destination according to some embodiments of the present disclosure.

In some embodiments, after determining the literal destination, the processing engine 112 (e.g., the processor 220) may generate electronic signals including the literal destination and a triggering code. In some embodiments, the triggering code may be in a formal recognizable by an application (e.g., a transportation service application, a taxi hailing service application, a navigation service application, etc.) installed in the user terminal 130. For example, the trigger code may be an instruction, a code, a mark, a symbol, or the like, or any combination thereof, that can motivate the user terminal 130 or let the user terminal 130 execute any program. The triggering code may be configured to rend the application to generate a presentation of the literal destination on an interface of the user terminal 130. FIG. 5B is an exemplary user interface of the user terminal 130 for presenting a literal destination according to some embodiments of the present disclosure. The textual "Xinghua Alley" and "Dinghao Building" are recognized as textual origin and destination. In some embodiments, the processing engine 112 may send the electronic signals to the information exchange port of the target system to direct the information exchange port to send the electronic signals to the user terminal 130. In response to receiving the electronic signals, the user terminal 130 may present the literal destination on the interface thereof to let the user confirm whether the literal destination is the user may express. The user may click any one of the two icons with "Yes" and "No" in boxes to confirm whether the literal destination is the user expresses.

Figure 6A:
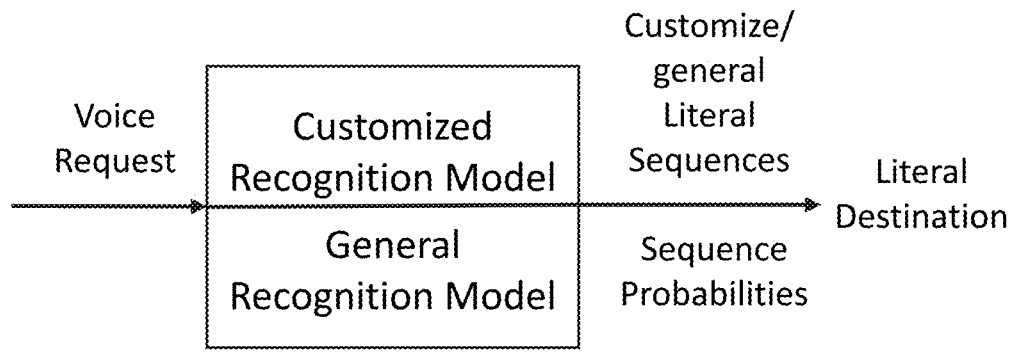
FIG. 6A is a schematic diagram illustrating exemplary process for recognizing a voice request into a literal destination according to some embodiments of the present disclosure.

FIG. 6A is a schematic diagram illustrating exemplary process for recognizing a voice request into a literal destination according to some embodiments of the present disclosure.

As shown in FIG. 6A, a voice request may be inputted into a customized recognition model and a general recognition model, respectively. The output of the customized recognition model may include a plurality of customized literal sequences and the corresponding sequence probabilities of the plurality of customized literal sequences, i.e., each sequence probability outputted from the customized recognition model corresponds to a customized literal sequence. The output of the general recognition model may include a plurality of general literal sequences and the corresponding sequence probabilities of the plurality of general literal sequences, i.e., each sequence probability outputted from the general recognition model corresponds to a general literal sequence. The system may compare the sequence probabilities from the 2 models to obtain a literal sequence from the plurality of customized literal sequences and the plurality of general literal sequence that has a greatest sequence probability as the literal destination. Details of determining a literal destination may be found elsewhere in the present disclosure (e.g., FIG. 7 and the descriptions thereof).

Figure 6B:
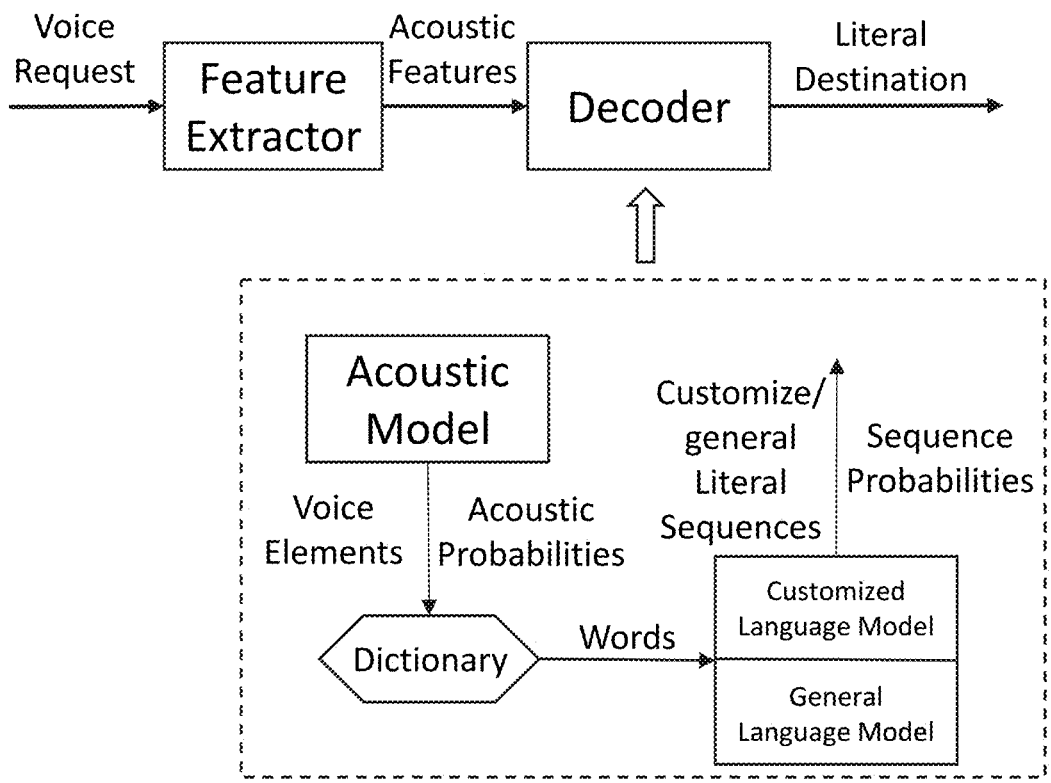
FIG. 6B is a schematic diagram illustrating exemplary process for recognizing a voice request into a literal destination according to some embodiments of the present disclosure.

FIG. 6B is a schematic diagram illustrating exemplary process for recognizing a voice request into a literal destination according to some embodiments of the present disclosure.

As shown in FIG. 6B, a voice request may be inputted into a feature extractor. The feature extractor may extract a plurality of features from the voice request. The extracted features may be inputted into a decoder. The decoder may include an acoustic model, a dictionary, a customized language model, and a general language model. The extracted features may be inputted into the acoustic model, and the acoustic model may output a plurality of phonemes and the corresponding acoustic probabilities of the plurality of phonemes. The plurality of phonemes may be inputted into a dictionary to look up a plurality of words corresponding to the plurality of phonemes in the dictionary. The plurality of words may be inputted into the customized language model and the general language model. The customized result may include a plurality of customized literal sequences and the corresponding sequence probabilities of the plurality of customized literal sequences, and the general result may include a plurality of general literal sequences and the corresponding sequence probabilities of the plurality of general literal sequences. The decoder may compare the sequence probabilities of the plurality of customized literal sequences and the plurality of general literal sequences, and output a literal sequence from the plurality of customized literal sequences and the plurality of general literal sequence that has a greatest sequence probability as the literal destination. Details of recognizing a voice request into a literal destination may be found elsewhere in the present disclosure (e.g., FIGS. 7-10 and the descriptions thereof).

FIG. 7 is a flowchart illustrating an exemplary process for determining a literal destination according to some embodiments of the present disclosure. The process 700 may be executed by the online to offline service AI system 100. For example, the process 700 may be implemented as a set of instructions (e.g., an application) stored in the storage ROM 230 or RAM 240. The processor 220 may execute the set of instructions, and when executing the instructions, it may be configured to perform the process 700. The operations of the illustrated process presented below are intended to be illustrative. In some embodiments, the process 700 may be accomplished with one or more additional operations not described and/or without one or more of the operations discussed. Additionally, the order in which the operations of the process as illustrated in FIG. 7 and described below is not intended to be limiting. In some embodiments, step 540 in process 500 may be performed based on process 700.

In process 710, the processing engine 112 (e.g., the processor 220, the destination determination module 440) may determine at least one customized result based on the voice request and the customized recognition model. Each of the at least one customized result may include a customized literal sequence and a sequence probability showing a probability that the voice request is associated with the customized literal sequence.

In some embodiments, the processing engine 112 may input the voice request into the customized recognition model as shown in FIG. 6A. The customized recognition model may analyze the voice request, and output at least one customized literal sequence and the corresponding sequence probability. The customized literal sequence may be a predicted literal sequence that the user may express in the voice request based on the customized recognition model. The corresponding sequence probability may predict a likelihood that the user may express the corresponding customized literal sequence in the voice request. The higher the sequence probability, the more likely that the corresponding customized literal sequence is that the user may express in the voice request.

In some embodiments, the customized recognition model may be a customized language model. The processing engine 112 may process the voice request, and input the processing result of the voice request into the customized language model as shown in FIG. 6B. For example, the processing engine 112 may extract a plurality of acoustic features from the voice request using a feature extractor. The plurality of acoustic features may include a spectral feature, a time domain feature, a Mel-Frequency Cepstral Coefficients (MFCC) feature, a log Mel-Frequency Spectral Coefficients (MFSC) feature, or the like, or any combination thereof. The processing engine 112 may input the plurality of acoustic features into an acoustic model to obtain a plurality of candidate voice elements and the corresponding acoustic probabilities showing a probability that the voice request is associated with the candidate voice element. The plurality of candidate voice elements may include phonemes, syllables, or any linguistic units, or any combination thereof. The plurality of candidate voice elements may map words in a dictionary with the plurality of candidate voice elements, and input the mapping words into the customized language model. The customized language model may analyze the mapping words to obtain at least one customized literal sequence and the corresponding sequence probability.

In process 720, the processing engine 112 (e.g., the processor 220, the destination determination module 440) may determine at least one general result based on the voice request and the general recognition model. Each of the at least one general result may include a general literal sequence and a sequence probability showing a probability that the voice request is associated with the general literal sequence.

In some embodiments, the processing engine 112 may input the voice request into the general recognition model as shown in FIG. 6A. The general recognition model may analyze the voice request, and output at least one general literal sequence and the corresponding sequence probability. The general literal sequence may be a predicted literal sequence that the user may express in the voice request based on the general recognition model. The corresponding sequence probability may predict a likelihood that the user may express the corresponding general literal sequence in the voice request. The higher the sequence probability, the more likely that the corresponding general literal sequence is that the user may express in the voice request.

In some embodiments, the general recognition model may be a general language model. The processing engine 112 may process the voice request, and input the processing result of the voice request into the general language model as shown in FIG. 6B. The method and/or process of processing the voice request, and obtaining at least one general literal sequence and the corresponding sequence probability may be similar with the method and/or process described in process 710.

In process 730, the processing engine 112 (e.g., the processor 220, the destination determination module 440) may determine a candidate literal sequence from the at least one customized literal sequence and the at least one general literal sequence as the literal destination. The candidate literal sequence may be a greatest sequence probability among the at least one customized literal sequence and the at least one general literal sequence.

In some embodiments, the processing engine 112 may compare the sequence probabilities of the at least one customized literal sequence and the at least one general literal sequence, and select the candidate literal sequence that has a greatest sequence probability from the at least one customized literal sequence and the at least one general literal sequence. The candidate literal sequence may be designated as the literal destination.

For example, the processing engine 112 receives a voice request including voice information of "Dinghao Building" from the user. The user has ever used the "Dinghao Building" as historical destination in a taxi hailing service. The customized recognition model is trained using the data of "Dinghao Building". When the processing engine 112 inputs the voice request (or data obtained from the voice request) into the customized recognition model and the general recognition model, respectively, the customized recognition model outputs textural "Dinghao Building" with the sequence probability of 99%; the general recognition model outputs textural "Dihao Building" with the sequence probability of 90%, and textural "Dinghao Building" with the sequence probability of 80%. The processing engine 112 may designate the textural "Dinghao Building" with the sequence probability of 99% output from the customized recognition model as the literal destination.

As another example, the processing engine 112 receives a voice request including voice information of "Dihao Building" from the user. The user has never used the "Dihao Building" as historical origin or destination in the taxi hailing service. When the processing engine 112 inputs the voice request (or data obtained from the voice request) into the customized recognition model and the general recognition model, respectively, the customized recognition model outputs textural "Dinghao Building" with the sequence probability of 69%; the general recognition model outputs textural "Dihao Building" with the sequence probability of 95%, and textural "Dinghao Building" with the sequence probability of 80%. The processing engine 112 may designate the textural "Dihao Building" with the sequence probability of 90% output from the general recognition model as the literal destination.

In some embodiments, the processing engine 112 may assign different weights to the customized results of the customized recognition model and the general results of the general recognition model, and determine the literal destination by calculating a weighted probability for the at least one customized literal sequence and the at least one general literal sequence.

Figure 8:
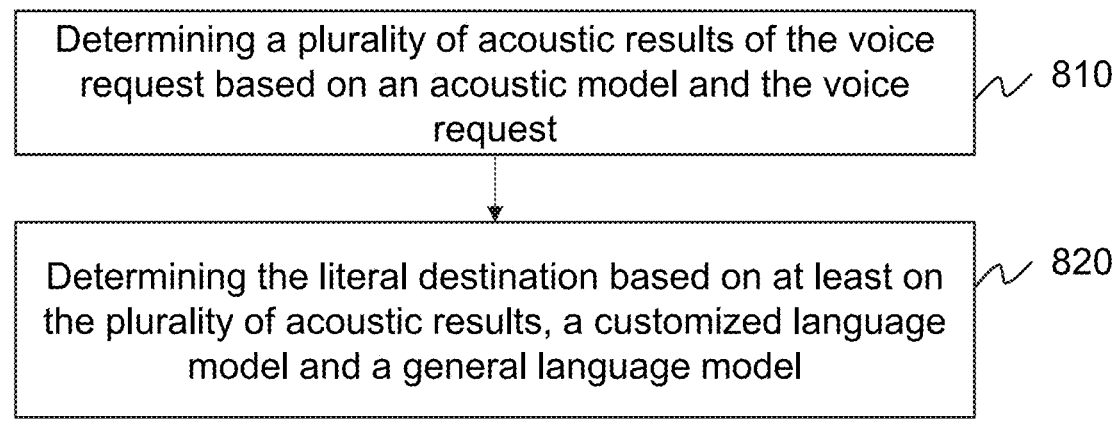
FIG. 8 is a flowchart illustrating an exemplary process for determining a literal destination according to some embodiments of the present disclosure.

FIG. 8 is a flowchart illustrating an exemplary process for determining a literal destination according to some embodiments of the present disclosure. The process 800 may be executed by the online to offline service AI system 100. For example, the process 800 may be implemented as a set of instructions (e.g., an application) stored in the storage ROM 230 or RAM 240. The processor 220 may execute the set of instructions, and when executing the instructions, it may be configured to perform the process 800. The operations of the illustrated process presented below are intended to be illustrative. In some embodiments, the process 800 may be accomplished with one or more additional operations not described and/or without one or more of the operations discussed. Additionally, the order in which the operations of the process as illustrated in FIG. 8 and described below is not intended to be limiting.

In process 810, the processing engine 112 (e.g., the processor 220, the literal destination determination module 440) may determine a plurality of acoustic results of the voice request based on an acoustic model and the voice request.

In some embodiments, the processing engine 112 may process the voice request (e.g., extracting acoustic features), and input the processing result of the voice request into the acoustic model. The acoustic model may be a method and/or algorithm that predict possible (or candidate) voice elements (e.g., phonemes, syllables, linguistic units) that make up the piece of voice of the voice request. The acoustic model may output the plurality of acoustic results. The acoustic result may be a predicted result that the acoustic model predicts. The acoustic result may include a plurality of candidate voice elements, such as phonemes, syllables, or any linguistic units, or any combination thereof. Details of determining the plurality of acoustic results may be found elsewhere in the present disclosure (e.g., FIG. 9 and the descriptions thereof).

In process 820, the processing engine 112 (e.g., the processor 220, the literal destination determination module 440) may determine the literal destination based at least one the plurality of acoustic results, the customized language model and the general language model.

In some embodiments, the customized language model may be obtained in process 520 of the process 500 in the present disclosure. The general language model may be obtained in process 530 of the process 500 in the present disclosure. In some embodiments, the processing engine 112 may process the at least one plurality of acoustic result to obtain a plurality of mapping words via the dictionary. The processing engine 112 may then input the plurality of mapping words into the customized language model and the general language model, respectively. The method and/or process of determining the literal destination may be similar with the process 700 in the present disclosure.

Figure 9:
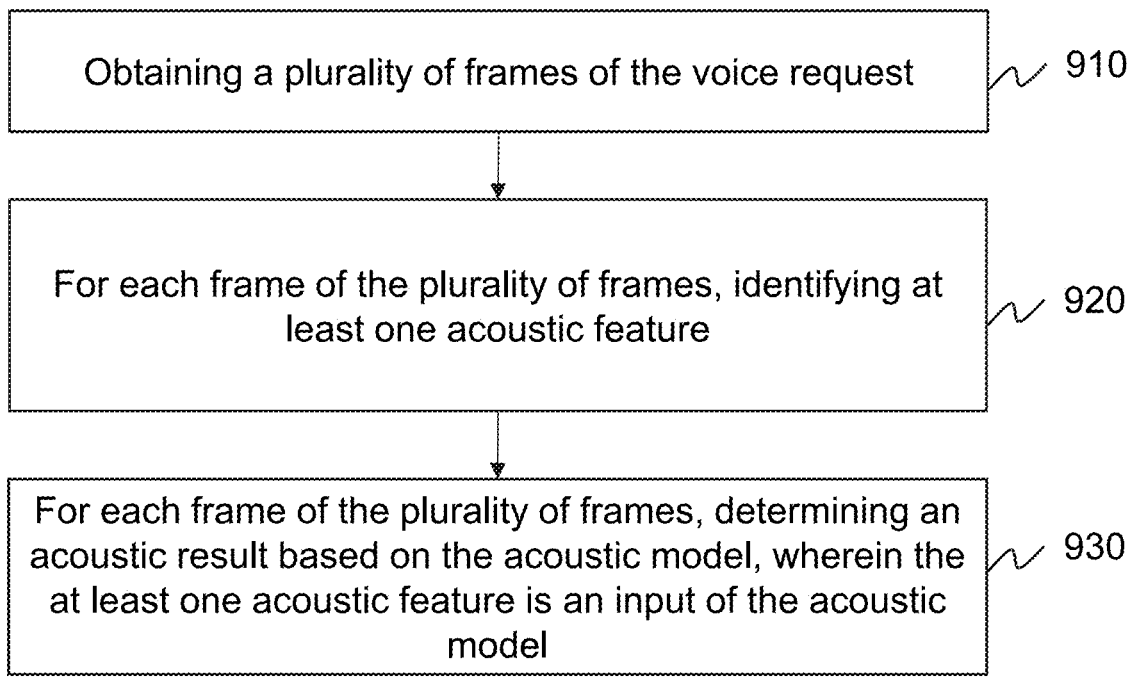
FIG. 9 is a flowchart illustrating an exemplary process for determining a plurality of acoustic results according to some embodiments of the present disclosure.

FIG. 9 is a flowchart illustrating an exemplary process for determining a plurality of acoustic results according to some embodiments of the present disclosure. The process 900 may be executed by the online to offline service AI system 100. For example, the process 900 may be implemented as a set of instructions (e.g., an application) stored in the storage ROM 230 or RAM 240. The processor 220 may execute the set of instructions, and when executing the instructions, it may be configured to perform the process 900. The operations of the illustrated process presented below are intended to be illustrative. In some embodiments, the process 900 may be accomplished with one or more additional operations not described and/or without one or more of the operations discussed. Additionally, the order in which the operations of the process as illustrated in FIG. 9 and described below is not intended to be limiting. In some embodiments, step 810 in process 800 may be performed based on process 900.

In process 910, the processing engine 112 (e.g., the processor 220, the destination determination module 440) may obtain a plurality of frames of the voice request. In some embodiments, the processing engine 112 may divide the voice request into a plurality of frames in a time sequence. Each of the plurality of frames may include data of a predetermine period of time. For example, each frame may include data of 25 microseconds, 100 microseconds, 25 milliseconds, 50 milliseconds, or the like, or any combination thereof.

In process 920, for each frame of the plurality of obtained frames, the processing engine 112 (e.g., the processor 220, the destination determination module 440) may identify at least one acoustic feature. In some embodiments, the processing engine 112 may extract at least one acoustic feature from each frame through a feature extractor. In some embodiment, the acoustic feature may include a spectral feature, a time domain feature, a Mel-Frequency Cepstral Coefficients (MFCC) feature, a log Mel-Frequency Spectral Coefficients (MFSC) feature, or the like, or any combination thereof.

In process 930, for each frame of the plurality of obtained frames, the processing engine 112 (e.g., the processor 220, the destination determination module 440) may determine an acoustic result based on the acoustic model, wherein the at least one acoustic feature is an input of the acoustic model.

The acoustic result may be a predicted result that the acoustic model predicts. For example, the acoustic result may represent a relationship between an audio signal and a linguistic unit (e.g., a voice element, a phoneme, a syllable). In some embodiments, for each frame, the processing engine 112 may input the at least one acoustic feature of the frame into the acoustic model. The acoustic result may be outputs of the acoustic model. In some embodiments, the acoustic result may include at least one candidate voice elements and the corresponding acoustic probability showing a probability that the voice request is associated with the candidate voice element. For example, the acoustic probability may predict a likelihood that each frame of the voice request may pronounce the corresponding candidate voice element. The greater the acoustic probability, the more likely that the corresponding frame of the voice request pronounces the corresponding candidate voice element. In some embodiments, the plurality of candidate voice elements may include phonemes, syllables, or any linguistic units that make up the frame of the voice request, or any combination thereof.

Figure 10:
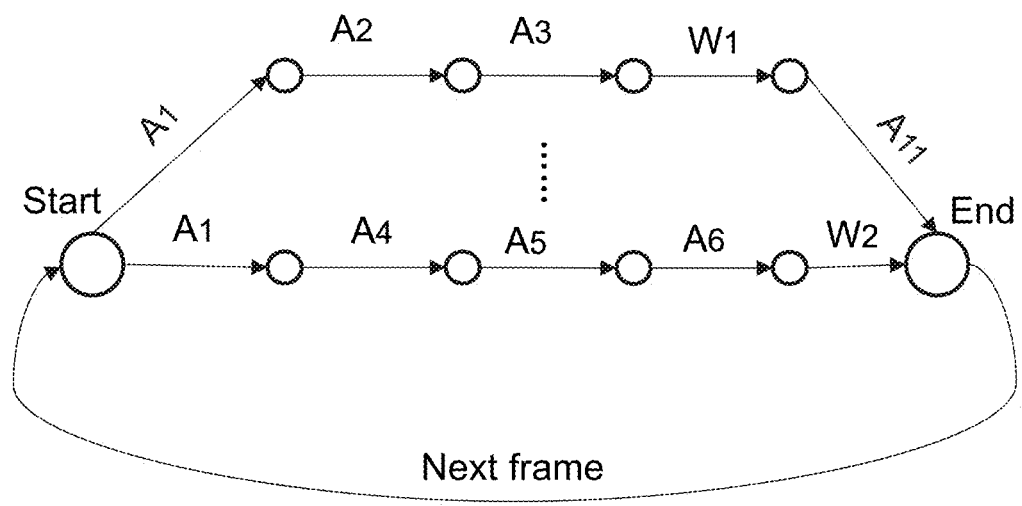
FIG. 10 is a schematic diagram illustrating exemplary process for determining a literal destination according to some embodiments of the present disclosure.

FIG. 10 is a schematic diagram illustrating exemplary process for determining a literal destination according to some embodiments of the present disclosure.

In some embodiments, for each frame of the voice request, the processing engine 112 (e.g., the processor 220, the destination determination module 440) may obtain a plurality of candidate voice elements based on the at least one acoustic feature of the frame and the acoustic model. For example, the processing engine 112 may input the at least one acoustic feature into the acoustic model. The acoustic model may output the plurality of candidate voice elements and the corresponding acoustic probabilities showing a probability that the voice request is associated with the candidate voice element. The acoustic probability may predict a likelihood that the each frame of the voice request may pronounce the corresponding candidate voice element. The greater the acoustic probability, the more likely that the corresponding frame of the voice request pronounces the corresponding candidate voice element. In some embodiments, the plurality of candidate voice elements may include phonemes, syllables, or any linguistic units that make up the frame of the voice request, or any combination thereof.

As shown in FIG. 10, the processing engine 112 may proceed a first frame from a "Start" node to an "End" node trough a plurality of paths. For example, in one path, the acoustic model outputs candidate voice elements, such as $A_1$, $A_2$, $A_3$, and $A_{11}$, and their corresponding acoustic probabilities. The processing engine 112 may then look up a dictionary that $A_1$, $A_2$, and $A_3$ correspond to a word $w_1$, and the customized language model (or the general language model) may output a literal probability of $w_1$. The literal probability may be a likelihood that the user may express the corresponding word in each frame of the voice request. The greater the literal probability that the customized language model (or the general language model) outputs, the more likely that the corresponding word is that the user may express in the frame. As another example, in another path, the acoustic model outputs candidate voice elements, such as $A_1$, $A_4$, $A_5$, and $A_6$, and their corresponding acoustic probabilities. The processing engine 112 may then look up a dictionary that $A_1$, $A_4$, $A_5$, and $A_6$ correspond to a word $w_2$, and the customized language model (or the general language model) may output a literal probability of $w_2$. Multiple paths are omitted. After proceeding the first frame, the processing engine 112 may then proceed a next frame using the same method. The processing engine 112 may select one path from each frame and link the plurality of corresponding paths of the plurality of frames of the voice request in sequence. A sequence probability showing a likelihood that the user may express the corresponding literal sequence in the voice request may be a sum of a product of a plurality of acoustic probabilities and a product of a plurality of literal probabilities of the linked path corresponding to the voice request. For example, the processing engine 112 may select one path from each frame and add the corresponding path probabilities to obtain a sequence probability. The processing engine 112 may select a literal sequence with a greatest sequence probability as the literal destination corresponding to the voice request.

FIG. 11 is a flowchart illustrating an exemplary process for training a general recognition model according to some embodiments of the present disclosure. The process 1100 may be executed by the online to offline service AI system 100. For example, the process 1100 may be implemented as a set of instructions (e.g., an application) stored in the storage ROM 230 or RAM 240. The processor 220 may execute the set of instructions, and when executing the instructions, it may be configured to perform the process 1100. The operations of the illustrated process presented below are intended to be illustrative. In some embodiments, the process 900 may be accomplished with one or more additional operations not described and/or without one or more of the operations discussed. Additionally, the order in which the operations of the process as illustrated in FIG. 11 and described below is not intended to be limiting. In some embodiments, step 530 in process 500 may be performed based on process 1100.

In process 1110, the processing engine 112 (e.g., the processor 220, the model training module 450) may obtain literal information of a plurality of locations from the general public.

In some embodiments, the literal information of the plurality of locations may be a plurality of location names in form of text. In some embodiments, the plurality of locations from the general public may be crawled by a web crawler from the whole Internet, a website, a service server, or the like, or any combination thereof. For example, the plurality of locations from the general public may include historical locations that users of a particular service platform have used, such as historical destinations, historical origins, historical service locations, or the like, or any combination thereof. As another example, the plurality of locations from the general public may be locations that appears in the World Wide Web (WWW).

In process 1120, the processing engine 112 (e.g., the processor 220, the model training module 450) may train an initial language model using the literal information of the plurality of locations as inputs of the initial language model to obtain the general recognition model. In some embodiments, the general recognition model may be a general language model.

In some embodiments, the initial language model may be an algorithm and/or method to predict a likelihood that a word appears in a literal sequence (e.g., a phrase, a sentence, etc.). For example, the initial language model may be a unigram model, an N-Gram model, an exponential language model, a neural language model, or the like, or any combination thereof.

In some embodiments, the processing engine 112 may input the plurality of locations of the general public into the initial language model to train the initial language model. For example, the processing engine 112 may input a plurality of historical location names in form of text crawled from a taxi hailing service platform into a neural language model. The parameters (e.g., layers, nodes, weights, etc.) in the neural language model may be determined to obtain the general language model.

In some embodiments, the processing engine 112 may offline train the general recognition model. For example, the processing engine 112 may train the general recognition model every a predetermined period of time. As another example, the processing engine 112 may train the general recognition model only once after crawling the literal information of the plurality of locations. In some embodiments, the processing engine 112 may store the trained general recognition model in a storage medium (e.g., the storage 140, ROM 230 or RAM 240) of the AI system 100.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the descriptions, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and describe.

What is claimed is:

1. An artificial intelligent system of one or more electronic devices for providing an online to offline service in response to a voice request from a user terminal, comprising:
   at least one information exchange port of a target system, wherein the target system is associated with a user terminal to receive a voice request from the user terminal through wireless communications between the at least one information exchange port and the user terminal;
   at least one storage medium including an operation system and a set of instructions compatible with the operation system for providing an online to offline service in response to a voice request from a user terminal; and
   at least one processor in communication with the at least one storage medium, wherein when executing the operation system and the set of instructions, the at least one processor is further directed to:
   receive the voice request from the user terminal;
   obtain a customized recognition model trained using data associated with a plurality of points of interest associated with the user terminal;
   obtain a general recognition model trained using data from general public;
   determine a literal destination associated with the voice request based at least on the voice request, the customized recognition model and the general recognition model;
   in response to determining the literal destination, generate electronic signals including the literal destination and a triggering code, wherein the triggering code is:
      in a format recognizable by an application installed in the user terminal, and
      configured to rend the application to generate a presentation of the literal destination on an interface of the user terminal; and
   send the electronic signals to the at least one information exchange port of the target system to direct the at least one information exchange port to send the electronic signals to the user terminal, wherein to determine the literal destination associated with the voice request based at least on the voice request, the customized recognition model, and the general recognition model, the at least one processor is directed to:
      determine at least one customized result based on the voice request and the customized recognition model, each of the at least one customized result including a customized literal sequence and a sequence probability showing a probability that the voice request is associated with the customized literal sequence;
      determine a sequence probability of each customized literal sequence by determining a sum of a product of acoustic probabilities corresponding to a plurality of phonemes outputted from an acoustic model and a product of literal probabilities corresponding to a plurality of words outputted from the customized recognition model;
      determine at least one general result based on the voice request and the general recognition model, each of the at least one general result including a general literal sequence and a sequence probability showing a probability that the voice request is associated with the general literal sequence;
      determine a sequence probability of each general literal sequence by determining a sum of a product of acoustic probabilities corresponding to a plurality of phonemes outputted from the acoustic model and a product of literal probabilities corresponding to a plurality of words outputted from the general recognition model; and
      determine the literal destination based on the sequence probability of each customized literal sequence and the sequence probability of each general literal sequence.

2. The system of claim 1, wherein the at least one processor is further directed to:
   in response to the voice request, update the customized recognition model.

3. The system of claim 1, wherein the plurality of points of interest includes a plurality of historical origins and a plurality of historical destinations of a plurality of historical online to offline services associated with a user of the user terminal.

4. The system of claim 1, wherein to determine the literal destination, the at least one processor is directed to:

determine a candidate literal sequence from the at least one customized literal sequence and the at least one general literal sequence as the literal destination, wherein the candidate literal sequence has a greatest sequence probability among the at least one customized literal sequence and the at least one general literal sequence.

5. The system of claim 1, wherein the customized recognition model is a customized language model, the general recognition model is a general language model, and the at least one processor is further directed to:
   determine a plurality of acoustic results of the voice request based on the acoustic model and the voice request; and
   determine the literal destination based at least on the plurality of acoustic results, the customized language model and the general language model.

6. The system of claim 5, wherein to determine the plurality of acoustic results, the at least one processor is further directed to:
   obtain a plurality of frames of the voice request;
   for each frame of the plurality of frames,
      identify at least one acoustic feature, and
      determine an acoustic result based on the acoustic model, wherein the at least one acoustic feature is an input of the acoustic model.

7. The system of claim 6, wherein each acoustic result includes a plurality of candidate voice elements and a plurality of corresponding acoustic probabilities, each acoustic probability shows a probability that the corresponding frame of voice request is associated with the corresponding candidate voice element.

8. The system of claim 1, wherein to obtain the general recognition model, the at least one processor is further directed to:
   obtain literal information of a plurality of locations from the general public; and
   train an initial language model using the literal information of the plurality of locations as inputs of the initial language model to obtain the general recognition model, wherein the general recognition model is a general language model.

9. The system of claim 8, wherein the literal information of the plurality of locations from the general public is crawled from Internet.

10. The system of claim 8, wherein the general recognition model is trained offline.

11. The system of claim 1, wherein the plurality of points of interest associated with the user terminal includes at least one of: a plurality of historical places where the user terminal had ever located, a plurality of locations of an area associated with the user terminal, or a plurality of historical locations of a plurality of similar users associated with the user terminal.

12. The system of claim 1, wherein the customized recognition model is a customized language model, and the data of the plurality of PIOs includes literal information of the plurality of POIs.

13. A method for providing an online to offline service in response to a voice request from a user terminal, implemented on one or more electronic devices having at least one information exchange port, at least one storage medium, and at least one processor in communication with the at least one storage medium, comprising:
   receiving a voice request from a user terminal;
   obtaining a customized recognition model trained using data of a plurality of points of interest associated with the user terminal;
   obtaining a general recognition model trained using data from general public;
   determining a literal destination associated with the voice request based at least on the voice request, the customized recognition model and the general recognition model;
   in response to determining the literal destination, generating electronic signals including the literal destination and a triggering code, wherein the triggering code is:
      in a format recognizable by an application installed in the user terminal, and
      configured to rend the application to generate a presentation of the literal destination on an interface of the user terminal; and
   sending the electronic signals to the at least one information exchange port to direct the at least one information exchange port to send the electronic signals to the user terminal, wherein the determining the literal destination associated with the voice request based at least on the voice request, the customized recognition model, and the general recognition model includes:
      determining at least one customized result based on the voice request and the customized recognition model, each of the at least one customized result including a customized literal sequence and a sequence probability showing a probability that the voice request is associated with the customized literal sequence;
      determining a sequence probability of each customized literal sequence by determining a sum of a product of acoustic probabilities corresponding to a plurality of phonemes outputted from an acoustic model and a product of literal probabilities corresponding to a plurality of words outputted from the customized recognition model;
      determining at least one general result based on the voice request and the general recognition model, each of the at least one general result including a general literal sequence and a sequence probability showing a probability that the voice request is associated with the general literal sequence;
      determining a sequence probability of each general literal sequence by determining a sum of a product of acoustic probabilities corresponding to a plurality of phonemes outputted from the acoustic model and a product of literal probabilities corresponding to a plurality of words outputted from the general recognition model; and
      determining the literal destination based on the sequence probability of each customized literal sequence and the sequence probability of each general literal sequence.

14. The system of claim 13 further comprising:
   in response to the voice request, updating the customized recognition model.

15. The method of claim 13, wherein the plurality of points of interest includes a plurality of historical origins and a plurality of historical destinations of a plurality of historical online to offline services associated with a user of the user terminal.

16. The method of claim 13, wherein the determining the literal destination includes:
   determining a candidate literal sequence from the at least one customized literal sequence and the at least one general literal sequence as the literal destination, wherein the candidate literal sequence has a greatest sequence probability among the at least one customized literal sequence and the at least one general literal sequence.

17. The method of claim 13, wherein the customized recognition model is a customized language model, the general recognition model is a general language model, and the method further includes:
  determining a plurality of acoustic results of the voice request based on the acoustic model and the voice request; and
  determining the literal destination based at least on the plurality of acoustic results, the customized language model and the general language model.

18. The method of claim 13, wherein the obtaining the general recognition model includes:
  obtaining literal information of a plurality of locations from the general public; and
  training an initial language model using the literal information of the plurality of location as inputs of the initial language model to obtain the general recognition model, wherein the general recognition model is a general language model.

19. The method of claim 13, wherein the plurality of points of interest associated with the user terminal includes at least one of: a plurality of historical places where the user terminal had ever located, a plurality of locations of an area associated with the user terminal, or a plurality of historical locations of a plurality of similar users associated with the user terminal.

20. A non-transitory computer readable medium, comprising an operation system and at least one set of instructions compatible with the operation system for providing an online to offline service in response to a voice request from a user terminal, wherein when executed by at least one processor of one or more electronic device, the at least one set of instructions directs the at least one processor to:
  receive a voice request from a user terminal;
  obtain a customized recognition model trained using data of a plurality of points of interest associated with the user terminal;
  obtain a general recognition model trained using data from general public;
  determine a literal destination associated with the voice request based at least on the voice request, the customized recognition model and the general recognition model;
  in response to determining the literal destination, generate electronic signals including the literal destination and a triggering code, wherein the triggering code is:
    in a format recognizable by an application installed in the user terminal, and
    configured to rend the application to generate a presentation of the literal destination on an interface of the user terminal; and
  send the electronic signals to at least one information exchange port of the one or more electronic device to direct the at least one information exchange port to send the electronic signals to the user terminal, wherein to determine the literal destination associated with the voice request based at least on the voice request, the customized recognition model, and the general recognition model, the at least one set of instructions directs the at least one processor to:
    determine at least one customized result based on the voice request and the customized recognition model, each of the at least one customized result including a customized literal sequence and a sequence probability showing a probability that the voice request is associated with the customized literal sequence;
    determine a sequence probability of each customized literal sequence by determining a sum of a product of acoustic probabilities corresponding to a plurality of phonemes outputted from an acoustic model and a product of literal probabilities corresponding to a plurality of words outputted from the customized recognition model;
    determine at least one general result based on the voice request and the general recognition model, each of the at least one general result including a general literal sequence and a sequence probability showing a probability that the voice request is associated with the general literal sequence;
    determine a sequence probability of each general literal sequence by determining a sum of a product of acoustic probabilities corresponding to a plurality of phonemes outputted from the acoustic model and a product of literal probabilities corresponding to a plurality of words outputted from the general recognition model; and
    determine the literal destination based on the sequence probability of each customized literal sequence and the sequence probability of each general literal sequence.

* * * * *